(12) United States Patent
Kim et al.

(10) Patent No.: US 11,287,015 B2
(45) Date of Patent: Mar. 29, 2022

(54) MULTI-SPEED TRANSMISSION FOR MOTOR

(71) Applicants: Bok Soung Kim, Seoul (KR); Do Hwan Kim, Seoul (KR); BYGEN CO., LTD., Namyangju-si (KR)

(72) Inventors: Bok Soung Kim, Seoul (KR); Do Hwan Kim, Seoul (KR); Hyung Bae Park, Seoul (KR); Joon Seo Kim, Gimpo-si (KR); Eung Sik Suk, Namyangju-si (KR); Young Shik Jeon, Yongin-si (KR); Yoo Gyun Kim, Goyang-si (KR); Jae Ho Hwang, Pocheon-si (KR); Hyeong Keun Park, Seongnam-si (KR); Dong Uk Seo, Seoul (KR); Jung Hun Kim, Namyangju-si (KR); Young Hee Ju, Guri-si (KR)

(73) Assignees: Bok Soung Kim, Seoul (KR); Do Hwan Kim, Seoul (KR); BYGEN CO., LTD., Namyangju-si (KR)

( * ) Notice: Subject to any disclaimer, the term of this patent is extended or adjusted under 35 U.S.C. 154(b) by 145 days.

(21) Appl. No.: 16/605,909

(22) PCT Filed: May 16, 2018

(86) PCT No.: PCT/KR2018/005619
§ 371 (c)(1),
(2) Date: Oct. 17, 2019

(87) PCT Pub. No.: WO2018/212595
PCT Pub. Date: Nov. 22, 2018

(65) Prior Publication Data
US 2020/0109769 A1  Apr. 9, 2020

(30) Foreign Application Priority Data

May 19, 2017  (KR) .................. 10-2017-0062295

(51) Int. Cl.
*F16H 3/089* (2006.01)
*F16H 61/02* (2006.01)
*F16H 61/684* (2006.01)

(52) U.S. Cl.
CPC ......... *F16H 3/089* (2013.01); *F16H 61/0297* (2013.01); *F16H 61/684* (2013.01); *F16H 2200/0039* (2013.01); *F16H 2306/40* (2013.01)

(58) Field of Classification Search
CPC .... F16H 3/089; F16H 61/0297; F16H 61/684; F16H 2306/40
(Continued)

(56) References Cited

U.S. PATENT DOCUMENTS 3,889,547 A * 6/1975 Sun .................. F16H 3/083
74/336 R
5,553,510 A * 9/1996 Balhorn ............. B62M 11/06
192/64
(Continued)

FOREIGN PATENT DOCUMENTS

EP  1289827  3/2003
EP  1982913  10/2008
(Continued)

OTHER PUBLICATIONS

International Search Report—PCT/KR2018/005619 dated Sep. 6, 2018.

*Primary Examiner* — Ha Dinh Ho
(74) *Attorney, Agent, or Firm* — Cantor Colburn LLP

(57) ABSTRACT

Provided is a transmission for a motor including: an input shaft rotating by driving force transmitted from the motor and having a plurality of pawls disposed on the outer circumferential surface; controller for controlling protrusion and retraction of the pawls; a plurality of driving gears through the centers of which the input shaft passes, which have ratchets formed on the inner circumferential surfaces (Continued)

thereof so as to be engaged with the pawls, and which are different in the number of gear teeth; a plurality of driven gears which are externally meshed with the driving gears and are different in the number of gear teeth; and an output unit for outputting rotary speed changed in speed by the driving gears and the driven gears.

19 Claims, 18 Drawing Sheets

(58) Field of Classification Search
USPC .......................................................... 74/335
See application file for complete search history.

(56) References Cited

U.S. PATENT DOCUMENTS

| 5,667,233 | A | * | 9/1997 | Metzinger | ................ | B62L 1/00 |
| | | | | | | 280/212 |
| 5,975,266 | A | * | 11/1999 | Balhorn | ................ | B62M 11/06 |
| | | | | | | 192/64 |
| 6,641,499 | B1 | * | 11/2003 | Willmot | ................ | F16H 3/721 |
| | | | | | | 475/172 |

FOREIGN PATENT DOCUMENTS

| JP | 2010276136 | 12/2010 |
| JP | 2010279136 | 12/2010 |
| KR | 20110012884 | 2/2011 |
| KR | 101260050 | 5/2013 |
| KR | 20150029223 | 3/2015 |
| KR | 20160011942 | 2/2016 |
| WO | 2001092094 | 12/2001 |

\* cited by examiner

FIG. 8
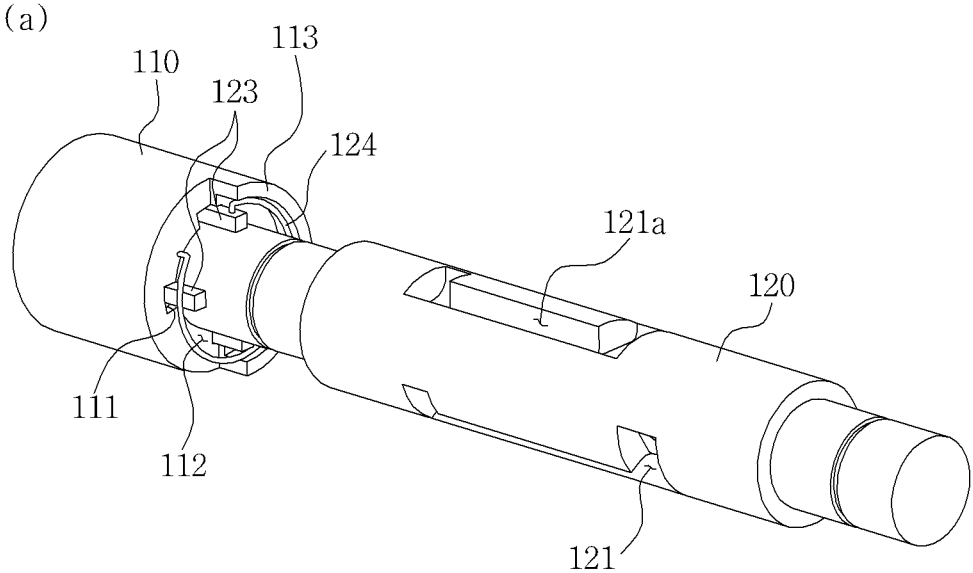
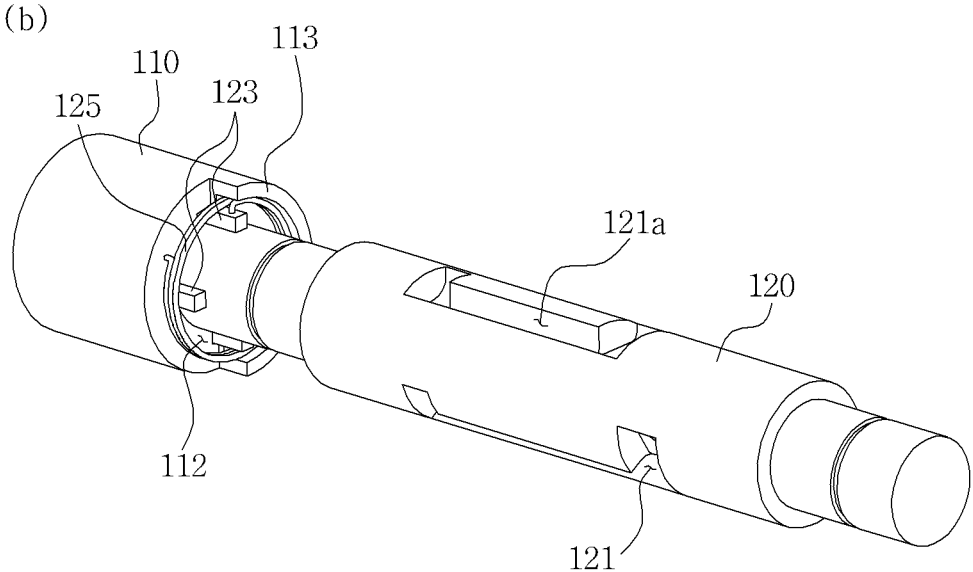

FIG. 15
(a)
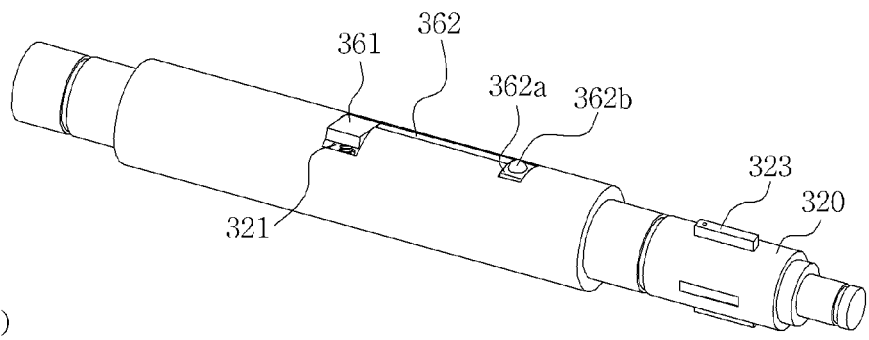
(b)
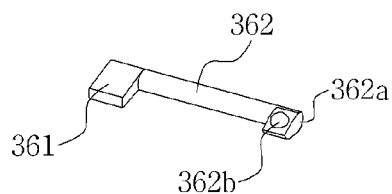
(c)
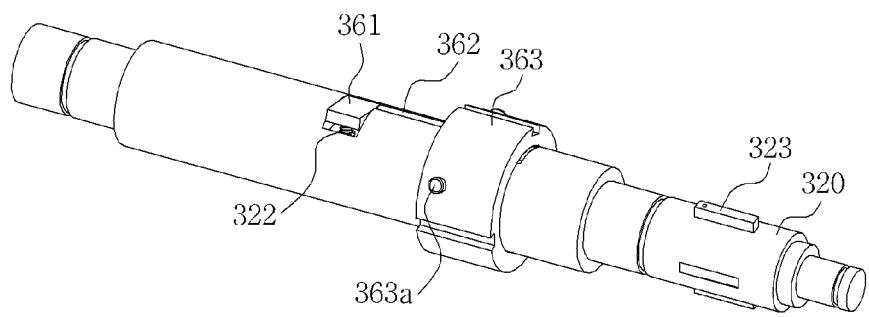
(d)
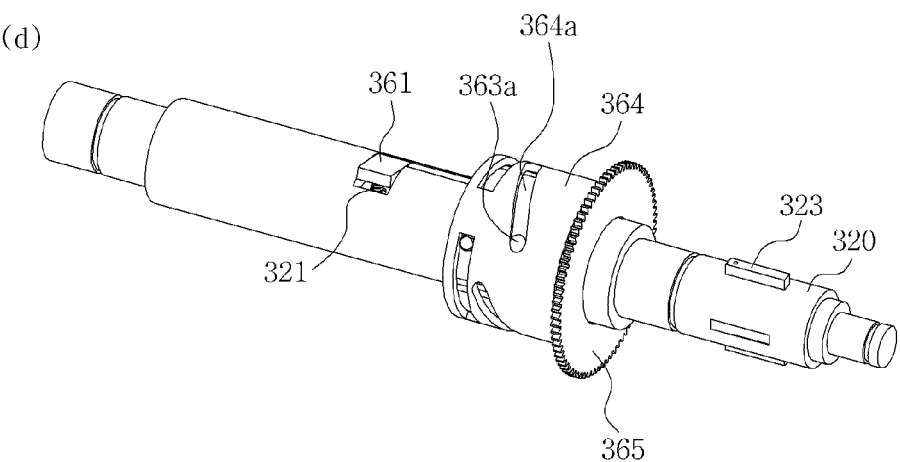

MULTI-SPEED TRANSMISSION FOR MOTOR

TECHNICAL FIELD

The present invention relates to a multi-gear transmission having three or more speeds, for a motor and, more specifically, to a transmission for a motor, which has a simple structure without a complicated hydraulic device and the like, has no energy consumption in shifting gears and shifting shock, and can be freely designed and manufactured with a desired number of speeds in a desired transmission gear ratio.

BACKGROUND ART

Recently, lots of electric vehicles are coming into wide use, but a multi-gear transmission of a motor for transportation means is not yet commercialized.

An engine cannot obtain torque at the time of initial startup, but a motor generates the maximum torque at the time of initial startup so as to provide excellent starting acceleration power. As described above, the motor is more suitable for transportation means in torque-speed characteristics than the engine.

However, the motor is very wasteful with fuel (electricity) and is difficult to run on a steep hillside since having no a multi-gear transmission. An electric vehicle generates the maximum torque at the time of initial startup and gradually reduces torque as speed increases. In order to compensate torque dropping after the initial startup, a driver has to step on an accelerator to apply lots of electric energy and increase RPM. That way, the motor consumes a great deal of energy and has lots of load to generate severe heat so that electric energy is wasted into thermal energy.

If there is a multi-gear transmission for a motor, it can prevent a waste of energy by effectively using a strong torque in various speed sections. Moreover, the electric vehicle can be effectively driven by a motor with a lower output. Therefore, if the multi-gear transmission is applied to the motor, it can significantly reduce energy consumption.

However, a conventional transmission for an engine is difficult to be applied to a motor since having a severe energy consumption in shifting and having a complicated structure.

A transmission for a motor has to satisfy the following conditions: 1) it has no energy consumption in shifting; 2) it has a simple structure without a hydraulic clutch, a synchronizer, a torque converter, and the likes; 3) it makes a smooth change of speed without shifting shock; and 4) it can change speed at a transmission ratio suitable for a three or more speed gear.

Now, a plurality of two-speed transmission for a motor have been disclosed. Such a two-speed transmission uses a speed reducer, which has been widely used in power tools. However, the two-speed transmission is difficult to be applied to a motor since it is too large at a shifting ration of a shifting section and is deteriorated in durability due to a severe shifting shock.

In the meantime, motors have been widely used as a driving source not only in transportation means like electric vehicles but also in the whole industry, such as electronic tools, generators, and so on. Therefore, motor-related technology is developing dramatically, but transmission-related technology is inferior to the motor-related technology.

DISCLOSURE

Technical Problem

Accordingly, the present invention has been made in view of the above-mentioned problems occurring in the prior art, and it is an object of the present invention to provide a multi-gear transmission for a motor, which has a simple structure without a complicated hydraulic device and the like, has no energy consumption in shifting gears.

It is another object of the present invention to provide a multi-gear transmission for a motor, which is possible to change speed smoothly without shifting shock.

It is a further object of the present invention to provide a multi-gear transmission for a motor, which can be freely designed and manufactured with a desired number of speeds in a desired transmission gear ratio.

Technical Solution

To accomplish the above object, according to the present invention, there is provided a transmission for a motor including: an input shaft rotating by driving force transmitted from the motor and having a plurality of pawls disposed on the outer circumferential surface; a controller for controlling protrusion and retraction of the pawls; a plurality of driving gears through the centers of which the input shaft passes, which have ratchets formed on the inner circumferential surfaces thereof so as to be engaged with the pawls, and which are different in the number of gear teeth; a plurality of driven gears which are externally meshed with the driving gears and are different in the number of gear teeth; and an output unit for outputting rotary speed changed in speed by the driving gears and the driven gears.

Moreover, the controller includes: a plurality of shifting bars each of which one end is combined with the pawl and the other end has a protrusion part disposed on the outer circumferential surface of the input shaft to protrude and retract; an elastic member disposed below the pawl or the protrusion part to elastically support the pawl or the protrusion part; an inner ring through the centers of which the input shaft passes, and which reciprocates in an axial direction of the input shaft in order to make the protrusion part protrude from and retract to the outer circumferential surface of the input shaft; and a moving unit for moving the inner ring in the axial direction of the input shaft.

Furthermore, the moving unit is an outer ring which surrounds the outer side of the inner ring and rotates to move the inner ring in the axial direction of the input shaft.

Additionally, a guide pin protrudes from any one among the inner ring and the outer ring, and a guide hole for guiding the guide pin is formed on the other one in a diagonal direction with respect to a circumferential direction.

In addition, the inner ring has a ring groove formed on the inner circumferential surface thereof in the circumferential direction so that the protrusion part protrudes out and escapes into the ring groove.

Moreover, a rotating spherical protrusion is disposed on the protrusion part to protrude, and the ring groove has a semi-circular cross section so that the spherical protrusion escapes into the ring groove.

Furthermore, the driven gears rotate at the same speed.

Additionally, the output unit is combined with any one among the driving gears to receive and output the shifted rotary speed.

In addition, the output unit receives the shifted rotary speed from any one among the driven gears and outputs the rotary speed.

Moreover, the input shaft includes a retaining protrusion formed at one end of the input shaft, and a shift clutch through the center of which the input shaft penetrates, which has a retaining groove formed on the inner circumferential surface so that the retaining protrusion is caught to the retaining groove, and to which driving force of the motor is inputted.

Furthermore, the transmission for a motor further includes a spring of which one end is connected to the shift clutch and the other end is connected to the input shaft.

Additionally, the retaining groove is wider than the retaining protrusion so that the retaining protrusion can move inside the retaining groove.

In another aspect of the present invention, there is provided a transmission for a motor including: an input shaft rotating by driving force transmitted from the motor; a plurality of driving gears having the input shaft in the middle of the driving gears and being different in the number of gear teeth; a plurality of driven gears which are externally meshed with the driving gears and are different in the number of gear teeth; an output shaft being parallel with the input shaft, serving as a central shaft of the driven gears, and outputting rotary speed changed in speed by the driving gears and the driven gears; a plurality of pawls disposed on the input shaft or the output shaft to protrude or retract from the outer circumferential surface; and a controller for controlling protrusion and retraction of the pawls.

Additionally, the controller includes: a plurality of shifting bars each of which one end is combined with the pawl and the other end has a protrusion part, which protrudes or retracts from the outer circumferential surface of the input shaft or the output shaft; an elastic member for elastically supporting lower portions of the pawl or the protrusion part; an inner ring through the center of which the input shaft or the output shaft penetrates, and reciprocating in an axial direction of the input shaft or the output shaft to make the protrusion part protrude or retract from the outer circumferential surface of the input shaft or the output shaft; and a moving unit for moving the inner ring in the axial direction of the input shaft or the output shaft.

In addition, the moving unit is an outer ring which surrounds the outer side of the inner ring and rotates to move the inner ring in the axial direction of the input shaft or the output shaft.

Moreover, a guide pin protrudes from any one among the inner ring and the outer ring, and a guide hole for guiding the guide pin is formed on the other one in a diagonal direction with respect to a circumferential direction.

Furthermore, the inner ring has a ring groove formed on the inner circumferential surface thereof in the circumferential direction so that the protrusion part escapes into the ring groove.

Additionally, a rotating spherical protrusion is disposed on the protrusion part to protrude, and the ring groove has a semi-circular cross section so that the spherical protrusion escapes into the ring groove.

In addition, one among the driving gears and the driven gear which are externally meshed with each other has a ratchet formed on the inner circumferential surface to be engaged with the pawl, and the other one among the driving gears and the driven gear which are externally meshed with each other is fixed at the input shaft or the output shaft.

Advantageous Effects

As described above, the multi-gear transmission for a motor according to the present invention has a simple structure without a complicated hydraulic device and the like, has no energy consumption in shifting gears since having pawls disposed on a rotating shaft (an input shaft or an output shaft) and changing speed while rotating at the same speed as the input shaft.

Moreover, the multi-gear transmission for a motor according to the present invention can be freely designed and manufactured with a desired number of speeds in a desired transmission gear ratio.

Furthermore, the multi-gear transmission for a motor according to the present invention can satisfy all of torque (power) and speed, has no problem in running on a steep hillside, and can maximize fuel efficiency if it is applied to transportation means, such as electric vehicles or electric motorcycles.

Additionally, the multi-gear transmission for a motor according to the present invention is possible to change speed smoothly without shifting shock.

The multi-gear transmission for a motor according to the present invention can be used to change speed of motors, which are used not only in transportation means but also in the whole industry.

DESCRIPTION OF DRAWINGS

FIG. 8 is a view showing a shift clutch and an input shaft of the multi-gear transmission for a motor.

FIGS. 15 and 16 are views showing a controller of the multi-gear transmission for a motor according to the third preferred embodiment of the present invention.

BEST MODE

Hereinafter, the present invention will be described in detail with reference to the accompanying drawings.

Figure 1:
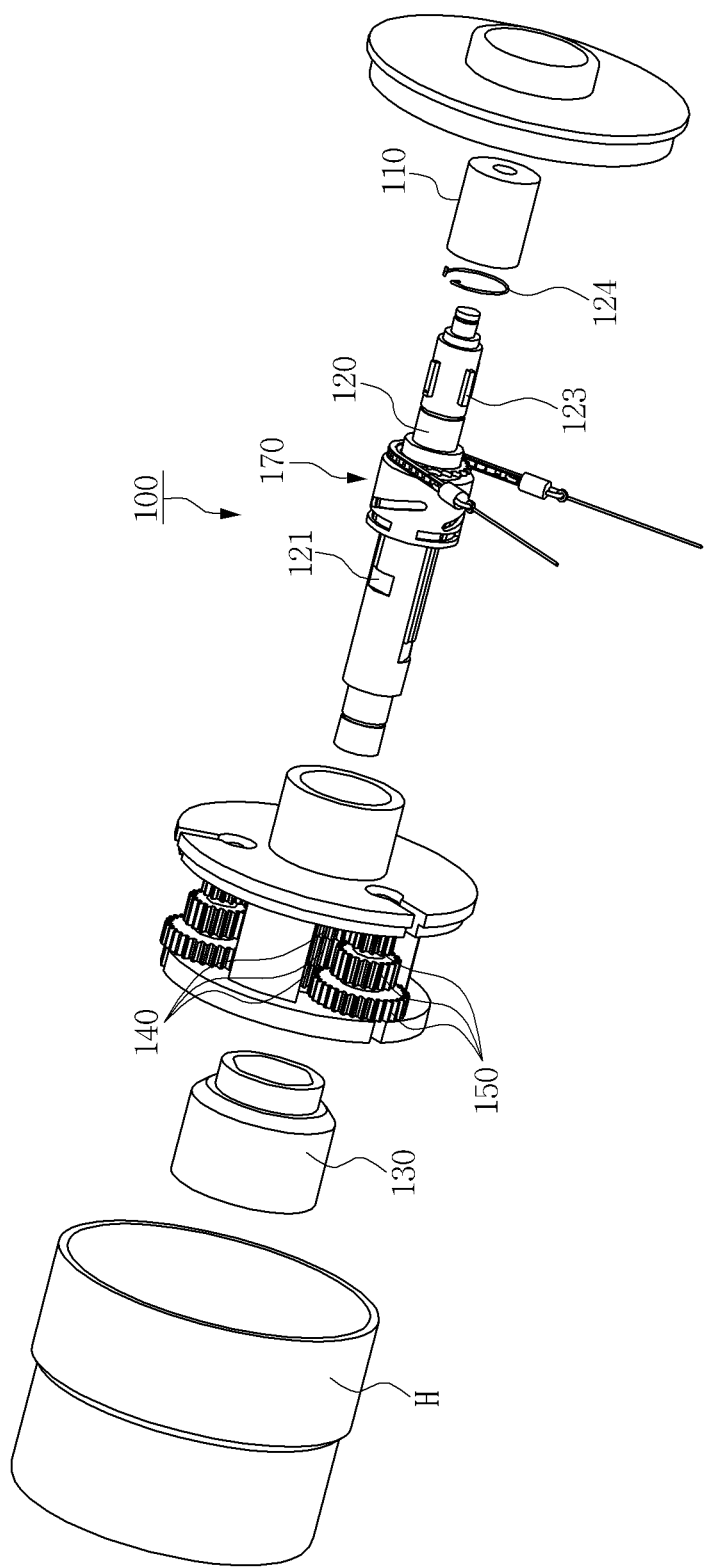
FIG. 1 is an exploded perspective view of a multi-gear transmission for a motor according to a first preferred embodiment of the present invention.
Figure 2:
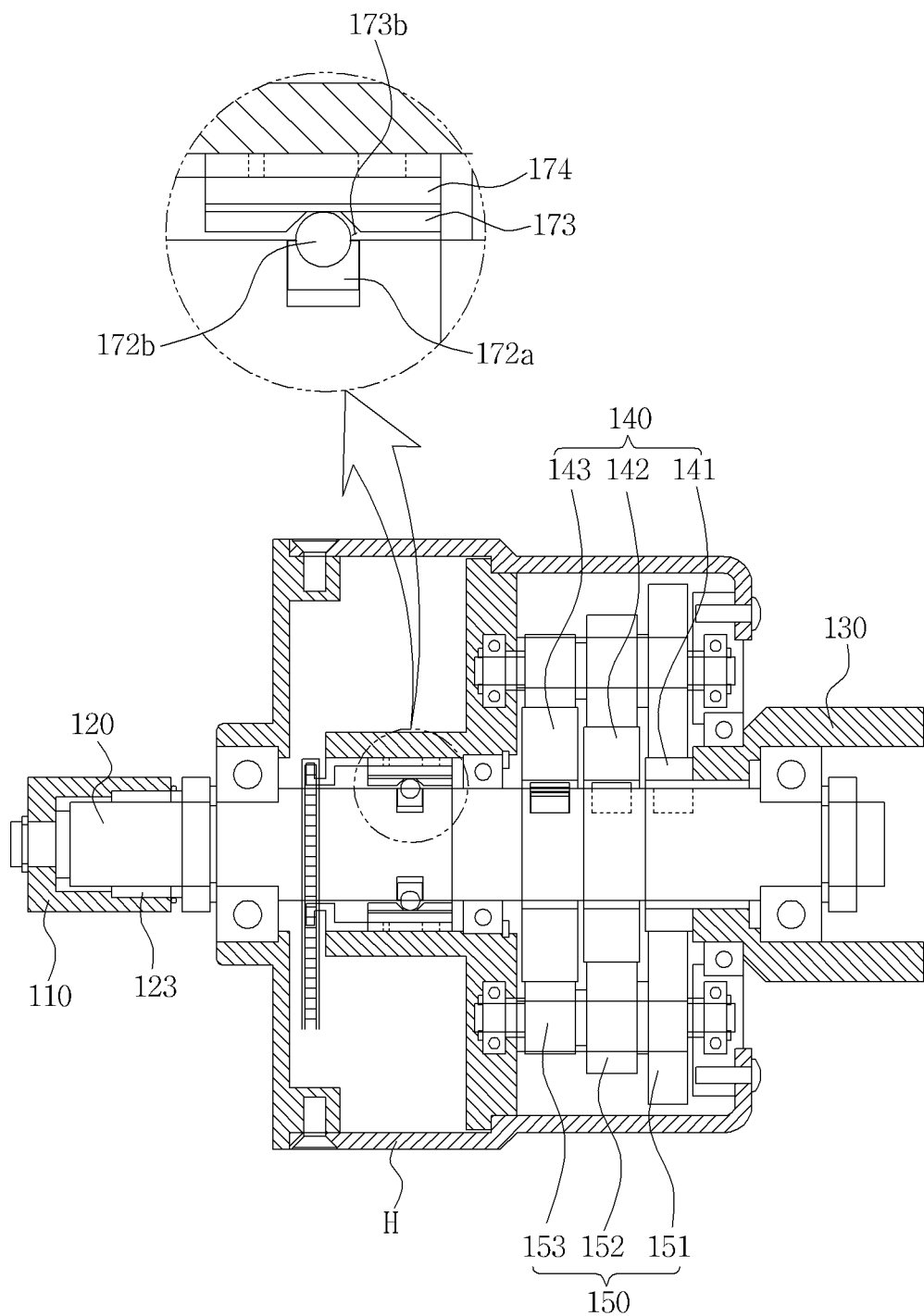
FIG. 2 is a plan sectional view of the multi-gear transmission for a motor.
Figure 3:
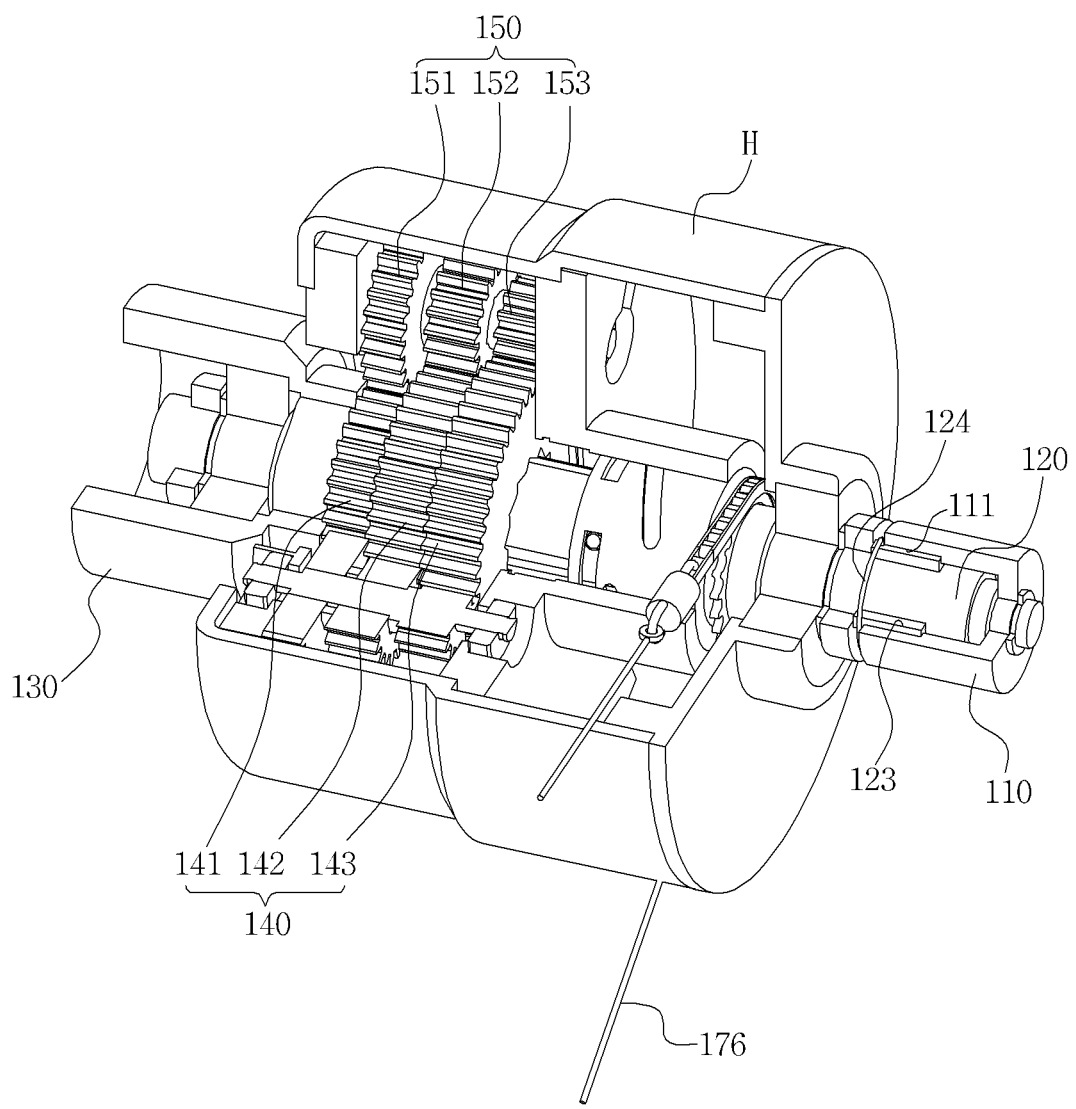
FIG. 3 is a perspective view, in partial section, of the multi-gear transmission for a motor.

Referring to FIGS. 1 to 3, a multi-gear transmission for a motor according to a first preferred embodiment of the present invention includes a housing H, an input shaft 120 which rotates by receiving driving power of a motor (not shown), driving gears 140 that the input shaft 120 penetrates through the center, and driven gears 150 externally meshed with the driving gears 140. Moreover, in this embodiment, driving power of the motor is transferred to the input shaft 120 through a shift clutch 110.

The input shaft 120 includes a plurality of seating grooves 121, and a plurality of pawls 171 (see FIG. 5) seated on the seating grooves 121 are provided. Especially, elastic members 122 are mounted in the seating grooves 121, so that the pawls 171 are elastically supported to protrude out of the input shaft 120 in a state where external force does not act.

Furthermore, the plurality of driving gears 140 through which the input shaft 120 penetrates in an axial direction are provided. Each of the driving gears 140 includes a ratchet 150a (See FIG. 5) formed on the inner circumferential surface to transmit rotary force of the input shaft so that the pawls 171 are caught to the ratchets 150a.

Additionally, the plurality of driven gears 150, which are externally meshed with the driving gears 140, are provided. In this embodiment, there are three driving gears 140 which are different in the number of gear teeth, and three driven gears 150, which are different in the number of gear teeth like the driving gears. Also, three pawls 171 are provided corresponding to the driving gears 140.

Therefore, the multi-gear transmission according to this embodiment can do three-stage shifting of gears.

Therefore, the transmission according to the present invention can do four or more stage shifting of gears without any change in structure if the transmission has four or more driving gears and four or more driven gears.

Moreover, the transmission includes an output unit 130 for outputting rotary speed shifted by the driving gears 140 and the driven gears 150. In this embodiment, the output unit 130 is combined with a first driving gear 141 which is the outermost driving gear among the driving gears 140.

Figure 4:
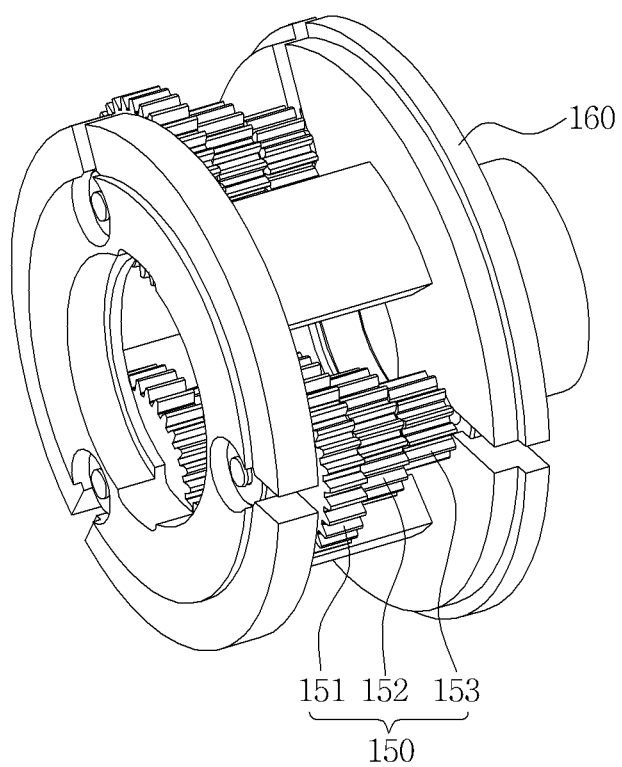
FIG. 4 is a view showing a driven gear set of the multi-gear transmission for a motor.

FIG. 4 illustrates a driven gear set. As shown in the drawing, in this embodiment, three driven gears 151 to 153, which are externally meshed with the driving gears and are different in the number of gear teeth, are provided. Especially, in this embodiment, the three driven gears 150 are combined with one another. For instance, when the second driven gear 152 rotates by receiving rotary force of the second driving gear 142 (See FIG. 5) which engages with the second driven gear 152, the other two driven gears 151 and 153 are also rotated at the same rotational speed as the second driven gear 152.

Furthermore, in this embodiment, there are three sets of three driven gears 151 to 153 disposed at an angle of 120 degrees, and they are axially combined with a gear box 160 to form driven gear sets.

Figure 5:
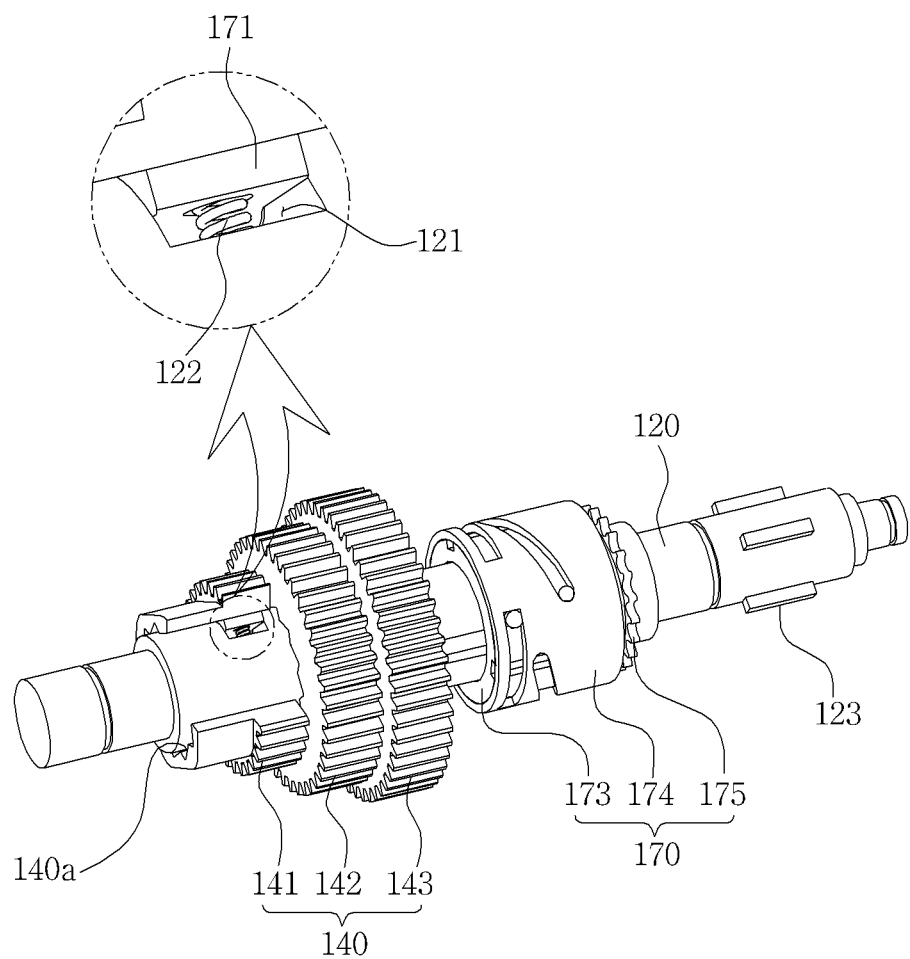
FIGS. 5 to 7 are a view showing a controller and a driving gear of the multi-gear transmission for a motor.

Referring to FIG. 5, the three driving gears 140 are disposed on the outer circumferential surface of the input shaft 120. Additionally, the ratchets 140a are formed on the inner circumferential surfaces of the driving gears 140, the seating grooves 121 are formed on the outer circumferential surface of the input shaft 120, and the pawls 171 are disposed in the seating grooves 121.

In the meantime, when any one among the plurality of pawls 171 protrudes out by operation of a controller 170, the protruding pawl 171 is caught to the ratchet 140a and rotary force of the input shaft 120 is transmitted to any one among the driving gears 141 to 143 so that the driving gear is rotated.

In this embodiment, the controller 170 includes the pawl 171, a shifting bar (172 in FIG. 6(b)), an outer ring 174, an inner ring 173, a transmission sprocket 175, and a wire (176 in FIG. 3).

Referring to FIGS. 6(a) to 6(d), in FIG. 6(a), the seating groove (121a in FIG. 8) is formed on the outer circumferential surface of the input shaft 120, and the pawl 171 is seated on the seating groove 121. Moreover, in this embodiment, the shifting bar 172 is also seated on the seating groove 121a formed on the outer circumferential surface of the input shaft 120. Especially, an elastic member (122 in FIG. 5) is disposed in the seating groove 121, in which the pawl 171 is seated, so that the pawl 171 is elastically supported to protrude out from the outer circumferential surface of the input shaft 120 when external force does not act. The elastic member may be formed at a lower portion of a protrusion part 172a of the shifting bar.

FIG. 6(b) illustrates the pawl 171 and the shifting bar 172 integrally combined with the pawl 171. As shown in the drawing, the shifting bar 172 includes a protrusion part 172a formed at one end thereof and a spherical protrusion 172b rotatably disposed on the upper surface of the protrusion part 172a. The protrusion 172b is a metal sphere like a ball bearing, and a hemispherical mounting hole is formed in the upper surface of the protrusion part 172a so that the spherical protrusion 172b can be seated rotatably (See the partially enlarged view of FIG. 2).

When the protrusion 172b is pressed, the pawl 171 combined with the shifting bar 172 swings inside the seating groove 121 goes down from the outer circumferential surface of the input shaft 120. Therefore, the pawl 171 protruding over the outer circumferential surface of the input shaft 120 by the elastic member 122 swings to escape into the seating groove 121 and does not protrude over the outer circumferential surface of the input shaft 120 anymore. In this instance, because the pawl 171 does not engage with the ratchet (140a in FIG. 5), even though the input shaft 120 rotates, the driving gears 140 does not rotate.

Furthermore, when the external force acting to the protrusion part 172a is removed, the pawl 171 swings by elastically restoring force of the elastic member 122 compressed elastically at the lower portion of the pawl 171 and protrudes over the outer circumferential surface of the input shaft 120. As described above, when the pawl 171 protrudes over the outer circumferential surface of the input shaft 120, the pawl 171 engages with the ratchet 140a to rotate the driving gear 140.

FIG. 6(c) illustrates a state where the inner ring 173 is inserted into the outer circumferential surface of the input shaft 120. As shown in the drawing, the inner ring 173 has a guide pin 173a formed to protrude.

FIG. 6(d) illustrates a state where the outer ring 174 is combined with the inner ring 173 while surrounding the inner ring 173. As shown in the drawing, the outer ring 174 has a guide hole 174a, and the guide hole 174a is formed in a diagonal direction with respect to a circumferential direction. Furthermore, the guide pin 173a is assembled to be restricted to the guide hole 174a. Therefore, when the outer ring 174 rotates, since the guide pin 173a moves along the guide hole 174a, the inner ring 173 moves from side to side in an axial direction of the input shaft inside the outer ring 174.

As described above, when the inner ring 173 moves from side to side, a ring groove (173b in FIG. 7) moves from side to side, and the protrusion 172b of the shifting bar, which corresponds to the ring groove, escapes into the ring groove 173b and the pawl 171 protrudes over the outer circumferential surface of the input shaft 120.

In order to move the inner ring 173 from side to side, the outer ring 174 has to rotate. So, the transmission sprocket 175 is combined with one side of the outer ring 174. The transmission sprocket 175 has the wire 176 (a chain in this embodiment) and pulls the wire 176 in order to rotate the outer ring 174, then, the inner ring 173 moves forward or backward. The forward and backward movement of the inner ring 173 controls that the pawl 171 protrudes or seats in the seating groove 121.

Figure 7:
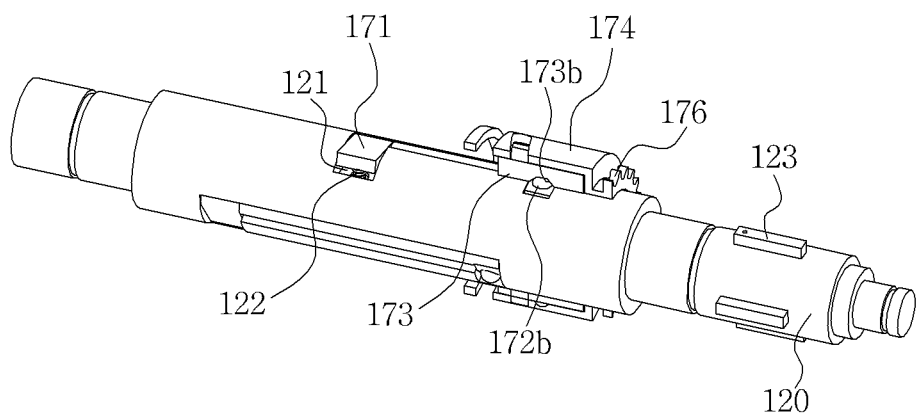

FIG. 7 illustrates a state where the pawl 171 is not seated on the seating groove 121 but protrudes, namely, a state where the pawl 171 protrudes outwardly from the outer circumferential surface of the input shaft 140.

The inner ring 173 has a band-shaped ring groove 173b formed on the inner circumferential surface of the inner ring 173 in the circumferential direction.

When the inner ring moves in the axial direction of the input shaft 120 and the ring groove 173b is located on the protrusion 172b of the shifting bar, the protrusion 172b escapes into the ring groove 173b by the elastic member 122 and can swing. When the protrusion 172b of the shifting bar 172 escapes into the ring groove 173b, the pawl 171 protrudes over the outer circumferential surface of the input shaft 120.

In this embodiment, the ring groove 173b is formed to make the protrusion 172b escape, but it is also possible that the ring groove 173b makes the protrusion part 172a escape.

Now, an operational state will be described. First, when the outer ring 174 rotates, the inner ring 173 moves in the axial direction, namely, in a horizontal direction, from the input shaft.

When the ring groove 173b formed on the inner circumferential surface by movement of the inner ring 173 is located on the protrusion 172b, the protrusion 172b escapes into the ring groove 173b by elastic force of the elastic member 122.

After that, the pawl 171 swings to protrude over the outer circumferential surface of the input shaft 120. The protruding pawl 171 engages with the ratchet 140a and rotary force of the input shaft 120 is transmitted to the driving gear 140, so that the driving gear 140 is rotated.

In this embodiment, in order to rotate the outer ring 174, the transmission sprocket 175 is formed integrally with one side of the outer ring 174 and pulls the wire 176 to move the inner ring 173 forward or backward. However, differently from the above, it is also possible that the outer ring 174 can be rotated forward or backward by a subminiature motor (not shown).

Furthermore, in this embodiment, the controller 170 has the outer ring 174 in order to move the inner ring 173 from side to side on the input shaft 120. It is also possible that a moving unit (not shown) for moving the inner ring 173 on the input shaft from side to side may be disposed instead of the outer ring 174 and a rotating means for rotating the outer ring.

The moving unit may be a well-known driving source, such as a subminiature motor or a cylinder.

Referring to FIG. 8, the shift clutch 110 is to absorb shifting shock and transmit driving force of the motor to the input shaft 120. The shift clutch 110 is formed in a cylindrical shape through which one end of the input shaft 120 penetrates, and includes a retaining groove 111 formed on the inner circumferential surface, an extension part 113 formed at one side along the outer circumferential surface, and an inner groove 112 in which springs 124 and 125 are mounted.

The input shaft 120 includes a retaining protrusion 123 caught to the retaining groove 111 of the shift clutch 110. When the shift clutch 110 rotates at a predetermined angle, the retaining protrusion 123 is caught to the retaining groove 111, and the input shaft 120 is also rotated together with the shift clutch 110.

Especially, in order to make it possible to move (rotate in the clockwise direction or in the counterclockwise direction) the retaining protrusion 123 in the retaining groove 111 by rotation of the input shaft 120, a width of the retaining groove 111 is larger than a width of the retaining protrusion 123.

Additionally, in order to absorb shifting shock, the spring 124 which is larger in diameter than the inner groove 112 is compressed and mounted in the inner groove 112.

In more detail, one end of the spring 124 is connected to the shift clutch 1110, and the other end is connected to the retaining protrusion 123. Elastically restoring force is applied to a direction to increase the diameter of the spring 124, which has the compressed diameter, namely, in a direction that both end portions of the spring get apart from each other.

FIG. 8(b) shows a state where the spring 125 is wound three times. The spring 125 shown in FIG. 8(b) can absorb shifting shock more effectively since is stronger in elastic force than the spring 124 shown in FIG. 8(a).

The shifting shock generated while changing speed is absorbed and relieved in two phases.

The first stage to absorb the shifting shock first absorbs the shifting shock by preventing the pawl 171 and the ratchet 140a from colliding with each other severely since a specific pawl 171 protruding from the input shaft 120 for shifting engages with the ratchet 140a formed on the inner circumferential surface of the driving gear while rotating together with the ratchet 140a.

The second stage to absorb the shifting shock is achieved by an action of the shift clutch 110 and the springs 124 and 125, and referring to FIG. 9, the second stage will be described in detail.

First, when the motor is operated in a state where the pawl 171 protrudes from the input shaft 120 for changing speed, driving force rotates the shift clutch 110. Rotary force of the shift clutch 110 is transmitted to the input shaft 120 by the medium of the spring 124 so that the input shaft 120 rotates. In this instance, because the retaining groove 111 (a left wall in the drawing) of the shift clutch cannot directly pushes the retaining protrusion 123 of the input shaft, rotary force is transmitted to the input shaft 120 by the medium of the spring 124 (See FIG. 9(a)). Moreover, the retaining protrusion 123 gets in contact with a right wall of the retaining groove 111 by the elastic force of the spring 124, which acts in the direction that the diameter is expanded or in the direction that both end portions get apart from each other, and a space S1 is formed at the left side.

When the input shaft 120 rotates together with the shift clutch 110, there is the moment that the pawl 171 engages with the ratchet 140a. Until the moment, external force does not act to the spring 124, and the rotary force of the shift clutch 110 is transmitted to the input shaft 120 by the medium of the spring 124 (See FIG. 9(b)).

After the pawl 171 and the ratchet 140a engage with each other, the spring 124 is compressed more by rotation of the shift clutch 110, and the retaining groove 111 (the left wall in the drawing) of the shift clutch 110 meets and pushes the retaining protrusion 123. Therefore, the driving force of the motor is transmitted from the shift clutch 110 to the input shaft 120 without the medium of the spring 124, and the driving gear 140 is rotated by rotation of the input shaft 120 (See FIG. 9(c)). In this instance, a space S2 is formed at the right side of the retaining protrusion 123.

In other words, in FIG. 9(b), the driving force of the motor is transmitted from the shift clutch 110 to the input shaft 120 by the medium of the spring 124. However, in FIG. 9(c), the driving force of the motor is directly transmitted to the input shaft 120 except through the spring 124 when the retaining groove 111 of the shift clutch pushes the retaining protrusion 123.

As described above, there is a time difference between the stage that the pawl 171 engages with the ratchet 140a (FIG. 9(b)) and the stage that the retaining groove 111 pushes the retaining protrusion 123, and especially, meanwhile, shifting shock is absorbed while the spring 124 is compressed.

If there is no spring 124, because the pawl 171 protrudes to change speed and the shift clutch 110 is rotated by rotation of the motor, shifting shock is generated while the retaining groove 111 directly collides against the retaining protrusion 124.

Moreover, in order to make shifting smooth before the action that the pawl 171 swings under the outer circumferential surface of the input shaft 120, the operation of the motor is loosened or stopped for a moment of shifting (shorter than one second). Then, engagement between the pawl 171 and the ratchet 140a is loosened and it makes it possible to change speed. If the motor stops its operation, the shift clutch 110 also stops rotation. In this instance, the retaining protrusion 123 moves while rotating in the clockwise direction in the retaining groove 111 by elastically restoring force of the spring 124, and then, returns to the state shown in FIGS. 9(a) and 9(b). Such a state makes it possible to continuously absorb shifting shock.

Hereinafter, an operation state of the multi-gear transmission according to the present invention will be described.

Referring to FIGS. 2 and 3, when the driving force of the motor is transmitted to rotate the input shaft 120 through the shift clutch 110, a passenger pulls the wire 176 of the controller 170 to make any one of the pawls 171 protrude from the seating groove 120, so that the corresponding driving gear 140 is operated. For instance, when the passenger pulls the wire 176 for the second stage shifting, the inner ring 173 moves on the input shaft to the right or the left while the outer ring 174 rotates. By such an action, the protrusion 172b of the protrusion part corresponding to the second stage shifting escapes into the ring groove 173b of the inner ring, so that the pawl 171 engages with the ratchet (140a in FIG. 5) of the second driving gear 142 corresponding to the second stage shifting.

Therefore, the rotary force of the input shaft 140 rotates the second driving gear 142, and rotates the second driven gear 150 meshed with the second driving gear 142. Even though the driving force is transmitted only to the second driven gear 152, because the driven gears 150 are all combined with one another, the first and the third driven gears 151 and 153 are also rotated at the same rotational speed, and the first driving gear 141 meshed with the first driven gear 151 is also rotated by changing speed at the same rotational speed as the second driven gear 152.

Additionally, rotary force of which speed is changed by the output unit 130 directly combined with the first driving gear 141 is outputted. The shifted rotary force changed in speed as described above rotates the output unit 130.

The output unit 130 is connected with, for instance, a front wheel axle or a rear wheel axle of an electric vehicle to transmit the shifted rotary speed, or is connected with a driving sprocket of an electric motorcycle or an electric bicycle to transmit the shifted rotary speed to a rear wheel through a chain.

Figure 10:
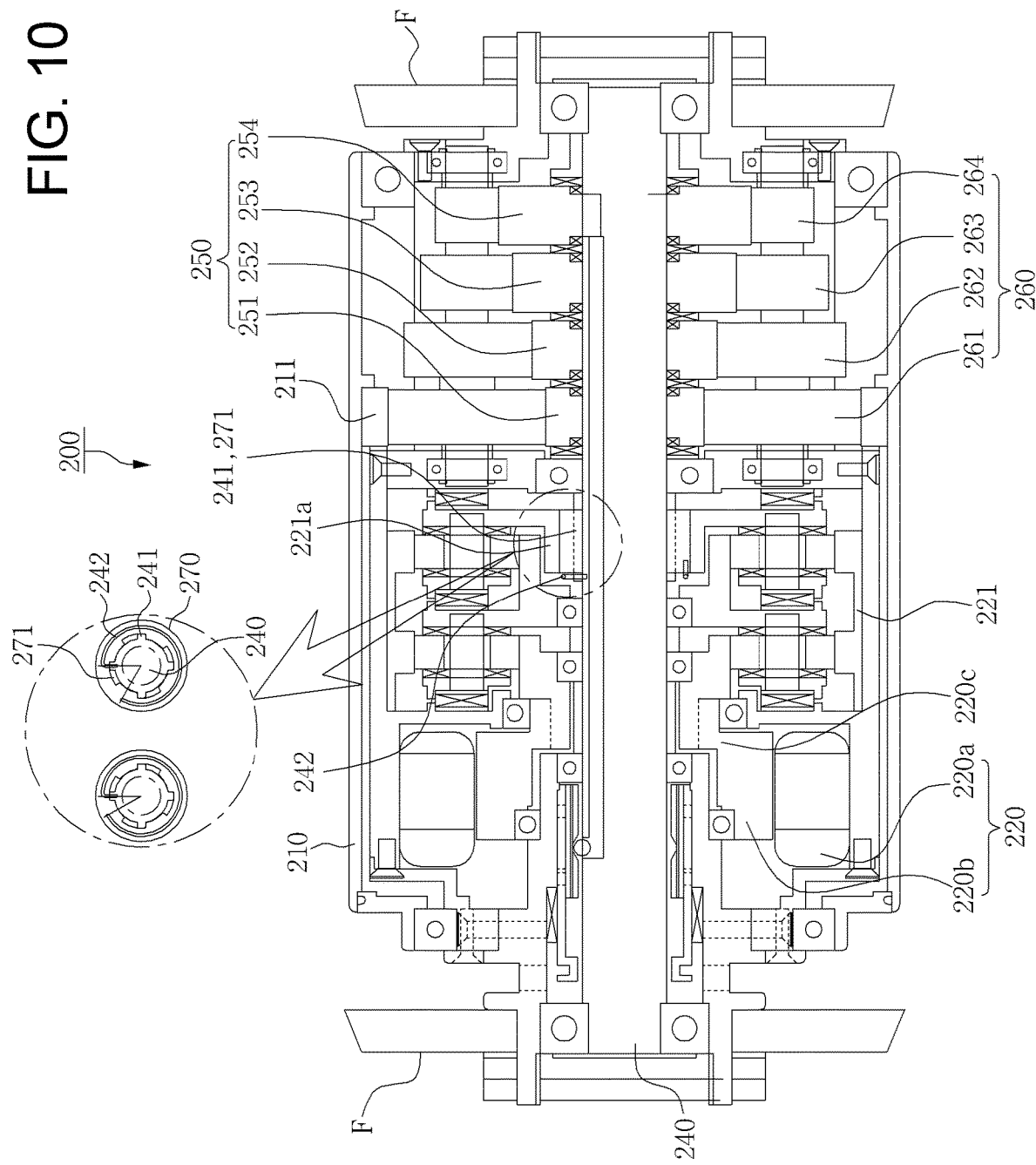
FIG. 10 is a view showing a multi-gear transmission for a motor according to a second preferred embodiment of the present invention.

FIG. 10 illustrates a multi-gear transmission according to a second preferred embodiment of the present invention.

The multi-gear transmission 200 according to the second preferred embodiment of the present invention includes a motor unit 220 and a decelerator unit 221 embedded in a hub shell 210 disposed at centers of front wheels or rear wheels of vehicles, motorcycles or bicycles, and an input shaft 240 mounted in the middle of the motor unit 220 and the decelerator unit 221. A frame F is combined with both sides of the hub shell 210, and a spoke (not shown) is combined.

Moreover, the multi-gear transmission 200 according to the second preferred embodiment of the present invention further includes: driving gears 250 through the centers of which the input shaft passes; and driven gears 260 externally meshed with the driving gears 250.

The motor unit 220 is a well-known driving source which operates by receiving electric power of a battery (not shown). A cable (not shown) connected with the battery is provided.

In this embodiment, the motor unit 220 includes a coil 220a which is a stator and a magnet 220b which is a rotor, which are formed in a ring shape. Therefore, the input shaft 240 penetrates through the center of the ring-shaped magnet 220b. Furthermore, when electric power is supplied from the battery, the magnet 220b is rotated, and a motor rotary shaft 220c is also rotated. In this embodiment, the motor rotary shaft 220c is connected with the decelerator unit 221.

Therefore, the driving force of the motor unit 220 is decelerated by the decelerator unit 221, and then, is outputted through a deceleration shaft 221a. Rotary force of the deceleration shaft 221a is transmitted to the input shaft 240 through the shift clutch 270.

In more detail, the shift clutch 270 has a retaining groove 271, and the input shaft 240 engaging with the retaining groove 271 has a retaining protrusion 241.

Therefore, the rotary force of the deceleration shaft 221a is transmitted to the shift clutch 270. When the shift clutch 270 rotates, the retaining groove 271 is caught to the retaining protrusion 241 with a time difference to rotate the input shaft 240.

The decelerator unit 221 is also a well-known means, and can select a deceleration ratio in various ways as occasion demands. In addition, as occasion demands, the decelerator unit 221 may be excluded.

The input shaft 240 has seating grooves (See the reference numeral 121 in FIG. 5), and a plurality of pawls (See the reference numeral 171 in FIG. 5) seated on the seating groove are disposed. Especially, an elastic member (See the reference numeral 122 in FIG. 5) is mounted in the seating groove, so that the pawls are elastically supported to protrude to the outside of the input shaft 240 in a state where external force does not act.

Moreover, there are four driving gears 251 to 254 through which the input shaft 240 penetrate in the axial direction. The driving gears 250 have ratchets (See the reference numeral 140a in FIG. 5) formed on the inner circumferential surfaces of the driving gears 250 so that the pawls are caught to the ratchets to transmit the rotary force.

Furthermore, a plurality of driven gears 261 to 264 which are externally meshed with the driving gears 251 to 254 are provided.

In this embodiment, there are four driving gears 250 which are different in the number of gear teeth, and there are four driven gears 260 which are different in the number of gear teeth like the driving gears 250.

Additionally, there are also four pawls corresponding to the driving gears 250.

In addition, a power transmission gear 211 is disposed between the first driven gear 261, which has the largest diameter among the driven gears 260, and the hub shell 210. That is, the rotary force of the motor 220 is inputted into the input shaft 240 through the shift clutch 270 after passing the decelerator unit 221, and the rotary force changed in speed after passing the driving gears 250 and the driven gears 260 is outputted to the hub shell 210. That is, in this embodiment, the hub shell 210 is the output unit. The rotary force outputted to the hub shell 210 passes the spokes connected to the hub shell 210 and operates the front wheels or the rear wheels of vehicles, motorcycles, or bicycles.

The driven gears 260 rotate at the same speed since being combined with each other.

Figure 6:
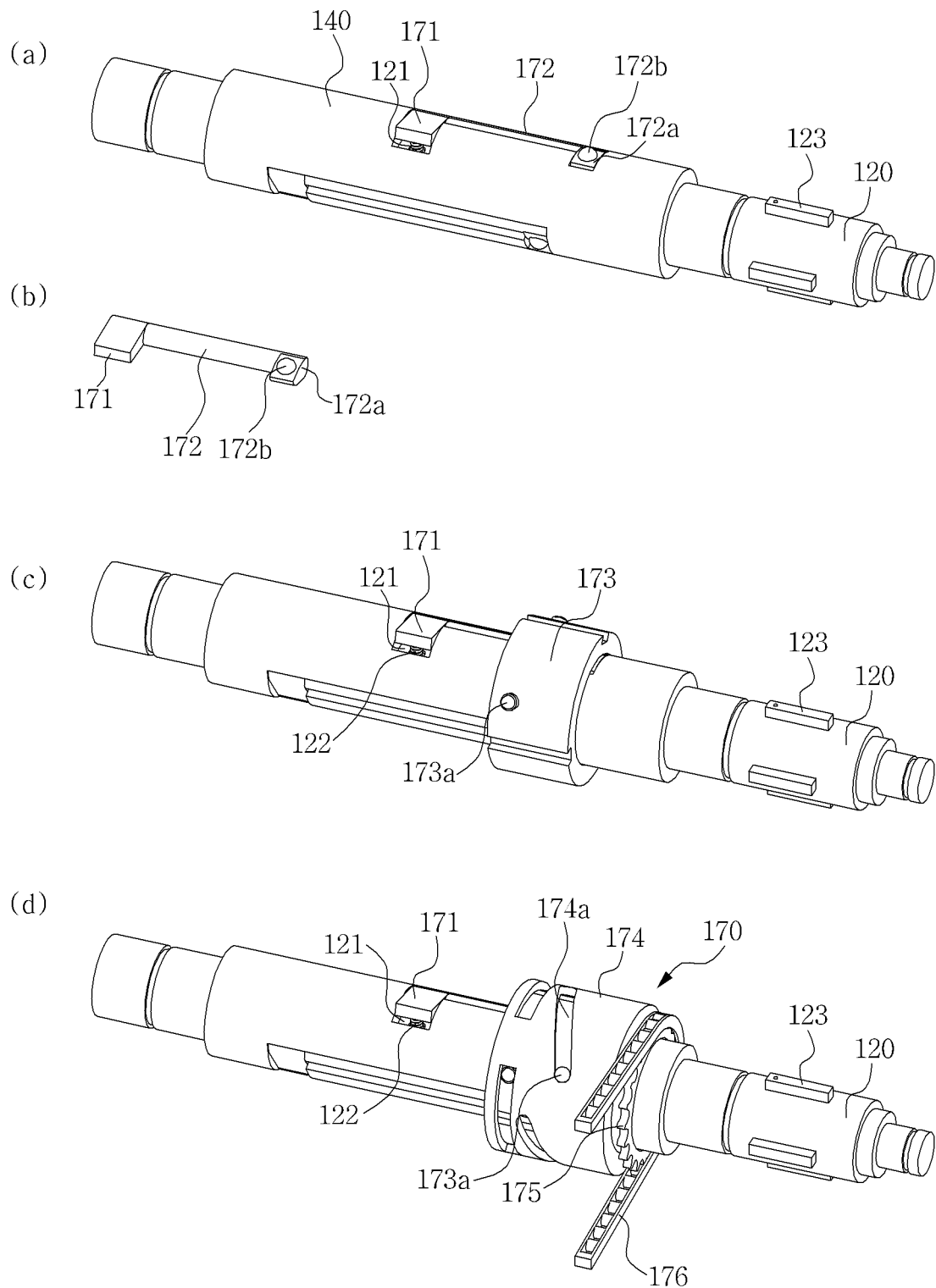

Because the controller is equal to the controller shown in FIGS. 5 to 7, detailed description of the controller will be omitted.

Differently from this embodiment, the motor and the decelerator may be disposed on the outer surface of the hub shell.

MODE FOR INVENTION

Figure 11:
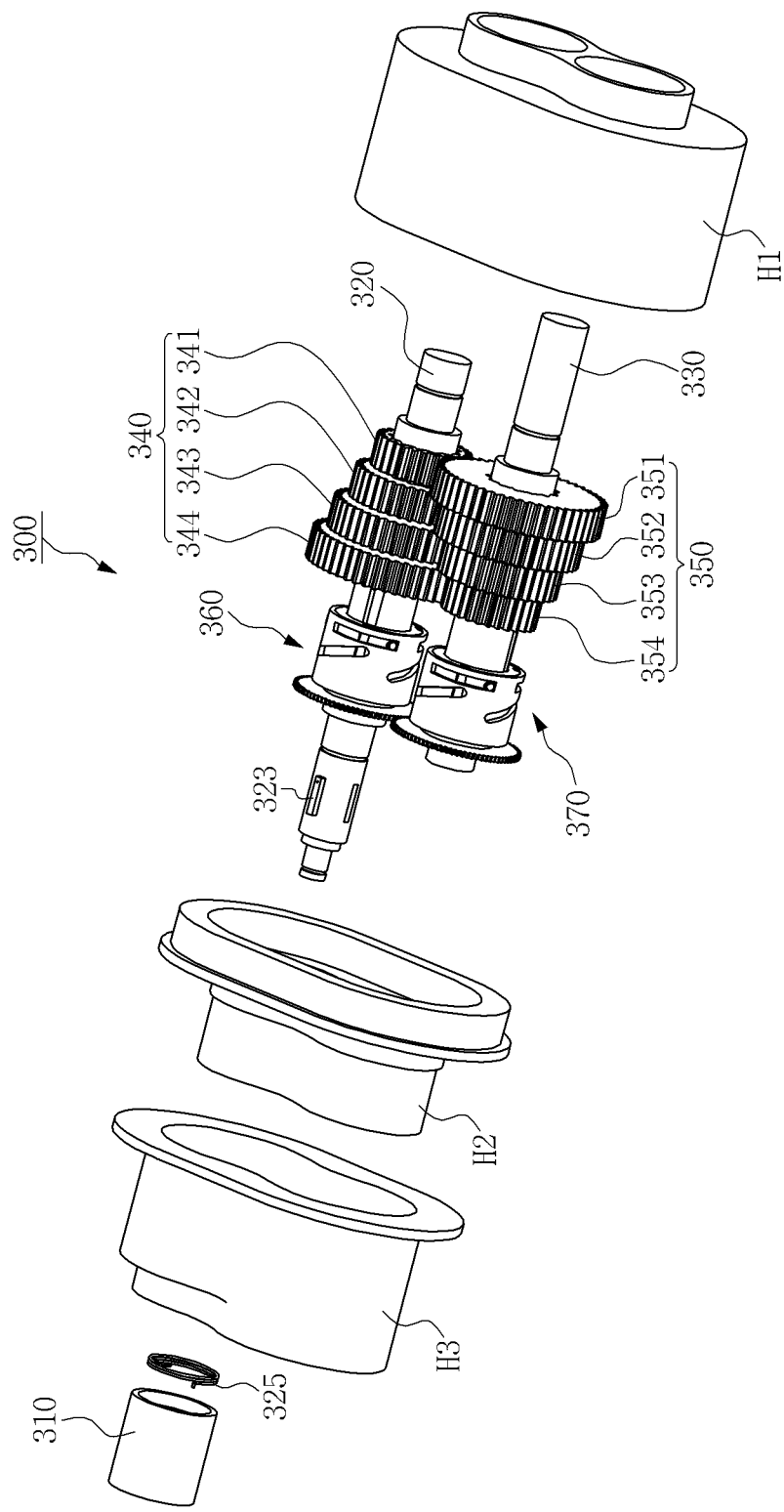
FIG. 11 is an exploded perspective view of a multi-gear transmission for a motor according to a third preferred embodiment of the present invention.
Figure 12:
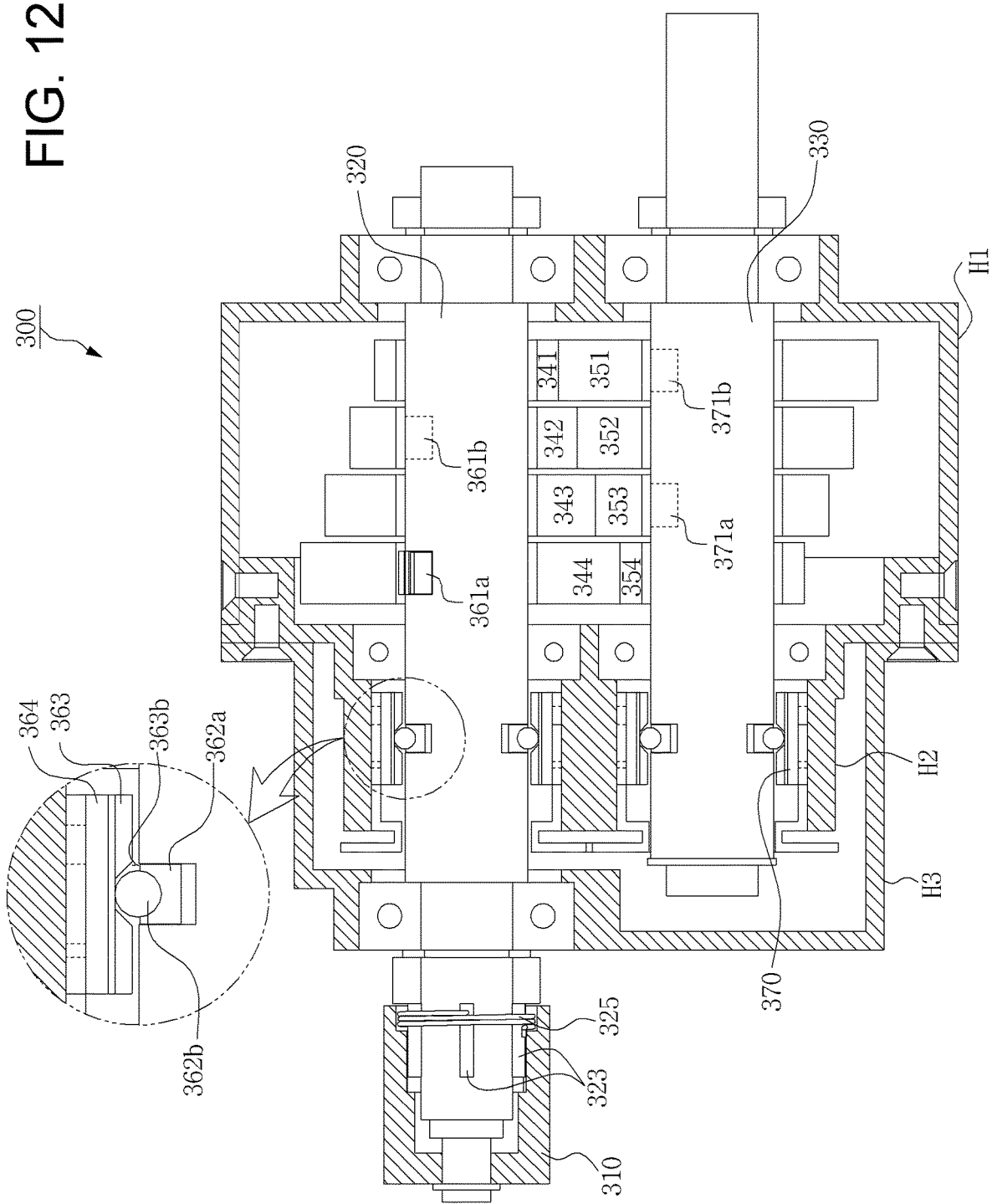
FIG. 12 is a plan sectional view of the multi-gear gear transmission for a motor according to the third preferred embodiment of the present invention.
Figure 13:
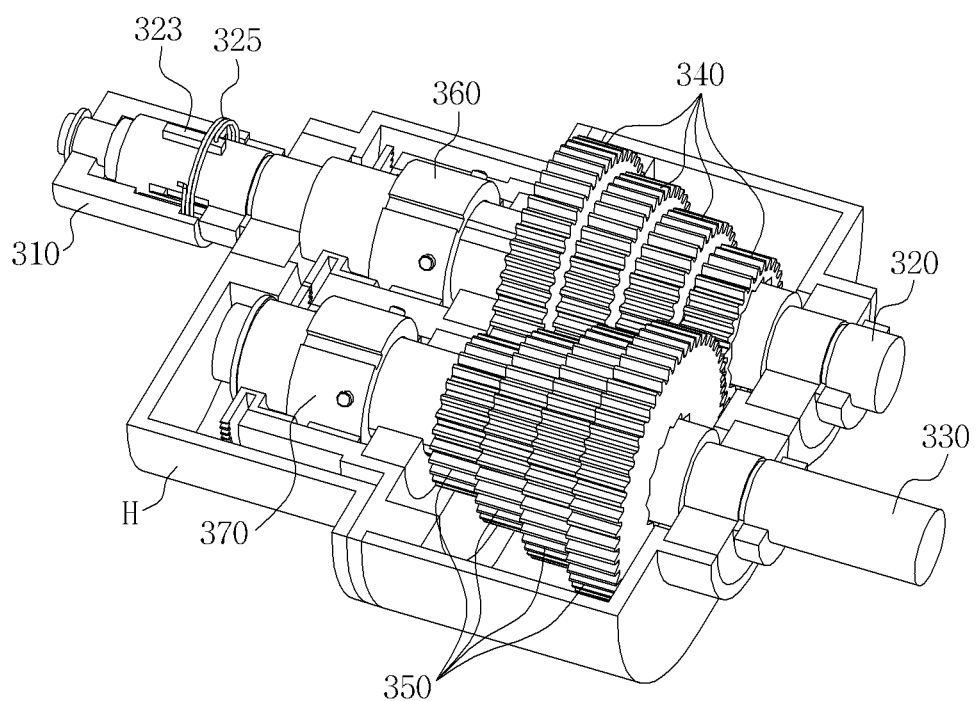
FIG. 13 is a perspective view, in partial section, showing the multi-gear transmission for a motor according to the third preferred embodiment of the present invention.

Referring to FIGS. 11 to 13, a multi-gear transmission 300 for a motor according to a third preferred embodiment of the present invention includes: housings H and H1 to H3; an input shaft 320 rotating by receiving driving force of a motor (not shown); four driving gears 340 through the centers of which the input shaft 320 is disposed; four driven gears 350 externally meshed with the driving gears 340; and an output shaft 330 which is a central shaft of the driven gears 350 and is parallel with the input shaft 320.

Moreover, in this embodiment, the driving force of the motor is not directly transmitted to the input shaft 320 but is transmitted to the input shaft 320 through a shift clutch 310.

The input shaft 320 has two seating grooves 321 (see FIG. 14) and two pawls 361a and 361b seated on the seating grooves 321. Especially, an elastic member 322 (in FIG. 14) is mounted on the seating groove 321 so that the pawl 361 is elastically supported to protrude outwardly from the input shaft 320 in a state where external force does not act.

Furthermore, a plurality of the driving gears 340 making the input shaft 320 as a central axis. Because the second and the fourth driving gears 342 and 344 among the driving gears 340 have ratchets (See the reference numeral 340a in FIG. 14), the pawls 361a and 361b are caught to the inner circumferential surfaces of the driving gears and the rotary force of the input shaft 320 is transmitted so that the second and fourth driving gears can be selectively combined with the input shaft 320 or released from the input shaft 320. Additionally, the first and third driving gears 341 and 343 always rotate together with the input shaft 320 since the centers of the first and third driving gears are fixed at the input shaft 320.

In addition, a controller 360 for individually controlling protrusion and retraction of the pawls 361a and 361b is disposed on the outer circumferential surface of the input shaft 320.

The four driving gears 340 are different in the number of gear teeth.

Moreover, there are four driven gears 350 externally meshed with the four driving gears 340. The four driven gears 350 are also different in the number of gear teeth.

The output shaft 330 penetrates through the centers of the driven gears 350 and is parallel with the input shaft 320 to output the shifted rotary force. The output shaft 330 has two seating grooves and two pawls 371a and 371b seated on the seating grooves. Especially, springs are mounted in the seating grooves so that the pawls 371a and 371b are elastically supported to protrude outwardly from the output shaft 330 in a state where external force does not act.

Furthermore, because the first and third driven gears 351 and 353 among the driven gears 350 have ratchets formed on the inner circumferential surfaces thereof so that the pawls 371a and 371b are caught to the ratchets and the rotary force is transmitted to the output shaft 330, they can be selectively combined with the output shaft 330 or released from the output shaft 330. Additionally, the centers of the second and fourth driven gears 352 and 354 are fixed at the output shaft 330.

In addition, a controller 370 for individually controlling protrusion and retraction of the pawls 371a and 371b is disposed on the outer circumferential surface of the output shaft 330.

The multi-gear transmission for a motor according to this embodiment can do four-stage shifting of gears.

Therefore, the multi-gear transmission for a motor according to the present invention can do five or more stage shifting of gears without any change in structure if the transmission has five or more driving gears and five or more driven gears.

Figure 14:
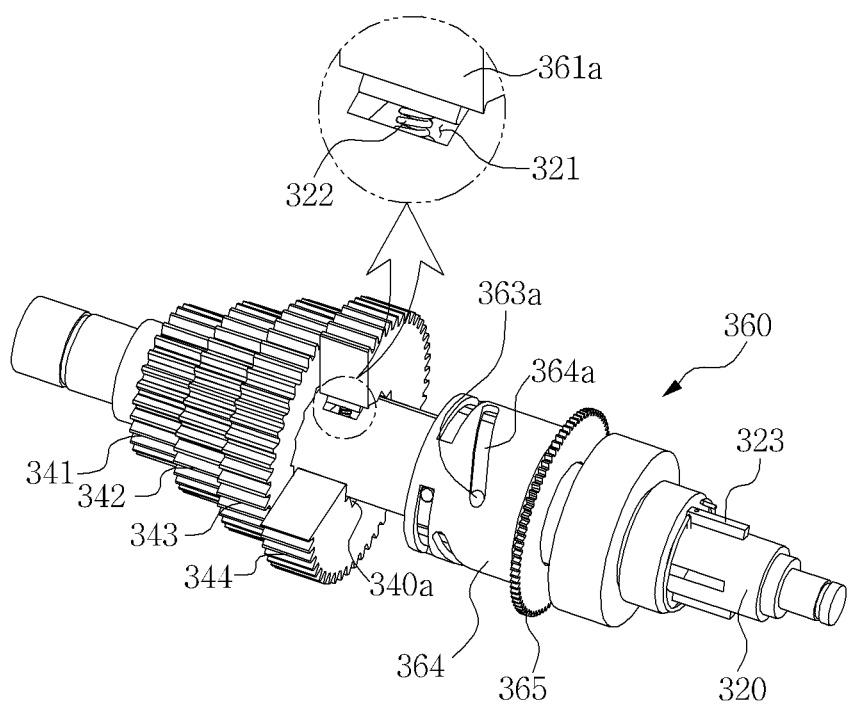
FIG. 14 is a view showing an input shaft and a driving gear of the multi-gear transmission for a motor according to the third preferred embodiment of the present invention.

Referring to FIG. 14, the four driving gears 340 are disposed on the outer circumferential surface of the input shaft 320. Moreover, as described above, the input shaft 320 has the two seating grooves 321 formed on the outer circumferential surface, and the pawl 361 and the elastic member 322 are disposed on the seating groove 321.

In this embodiment, the second driving gear 342 and the fourth driving gear 344 have the ratchets 340a formed on the inner circumferential surfaces thereof, and the first pawl 361b and the second pawl 361a are formed on the outer circumferential surface of the input shaft 320, on which the second driving gear 342 and the fourth driving gear 344 are located, are disposed to protrude and retract.

As described above, the second driving gear 342 and the fourth driving gear 344 are selectively combined with the input shaft 320 or released from the input shaft 320 by the controller 360, which controls the pawls 361a and 36b.

Unlike the second driving gear 342 and the fourth driving gear 344, the first driving gear 341 and third driving gear 343 are combined with the input shaft 320 or are formed integrally and fixed.

Likewise, the output shaft 330 has the two seating grooves formed on the outer circumferential surface thereof, and the pawls 371a and 371b are disposed on the seating grooves (See FIG. 12).

In this embodiment, the first driven gear 351 and the third driven gear 353 have the ratchets formed on the inner circumferential surfaces thereof, the third pawl 371b and the fourth pawl 371a are disposed on the outer circumferential surface of the output shaft 330, on which the first driven gear 351 and the third driven gear 353 are located, to protrude and retract.

Furthermore, the second driven gear 352 and the fourth driven gear 354 are combined with the output shaft 330 or are formed integrally and fixed.

Additionally, the first driving gear 341 and the first driven gear 351 are externally meshed with each other, and the first driving gear 341 is fixed at the input shaft 320 and the first driven gear 351 has the ratchet formed on the inner circumferential surface thereof so as to engage with the pawl 371*b*.

Likewise, the second driving gear 342 has the ratchet formed on the inner circumferential surface so as to engage with the pawl 361*b*, and the second driven gear 352 externally meshed with the second driving gear 342 is fixed at the output shaft 330 (See FIG. 12). In other words, any one among the driving gears 340 and the driven gears 350 which are externally meshed with each other has the ratchet, which is formed on the inner circumferential surface and with which the pawl engages, and another one is fixed at the input shaft 320 or the output shaft 330.

In addition, when any one of the plurality of pawls 361*a* and 361*b* protrudes out by operation of the controller 360 disposed on the input shaft 320, the protruding pawls 361*a* and 361*b* are caught to the ratchet 340*a* so that the rotary force of the input shaft 320 is transmitted to any one among the driving gears 342 and 344.

Alternatively, when any one among the plurality of pawls 371*a* and 371*b* protrudes out by operation of the controller 370 disposed on the output shaft 330, the protruding pawls 371*a* and 371*b* are caught to the ratchet 340*a* so that the rotary force of any one among the driven gears 351 and 353 is transmitted to the output shaft 330.

In this embodiment, the controller 360 or 370 includes a shifting bar (See the reference numeral 362 in FIG. 15(*b*)), an outer ring 374, an inner ring 373, and a rotating part 375.

FIG. 15 shows the controller 360 disposed on the input shaft 320. Referring to FIG. 15, in FIG. 15(*a*), the seating grooves 321 (See FIG. 14) are formed on the outer circumferential surface of the input shaft 320, and the pawls 361 are seated on the seating grooves 321. Moreover, in this embodiment, the shifting bar 362 is also seated on the seating groove (121*a* in FIG. 8) formed on the outer circumferential surface of the input shaft 320. Especially, an elastic member (322 in FIG. 14) is disposed in the seating groove 321, in which the pawl 361 is seated, so that the pawl 361 is elastically supported to protrude out from the outer circumferential surface of the input shaft 320 when external force does not act. The elastic member may be formed at a lower portion of a protrusion part 362*a* of the shifting bar.

FIG. 15(*b*) illustrates the pawl 361 and the shifting bar 362 integrally combined with the pawl 361. As shown in the drawing, the shifting bar 362 includes a protrusion part 362*a* formed at one end thereof and a spherical protrusion 362*b* rotatably disposed on the upper surface of the protrusion part 362*a*. The protrusion 362*b* is a metal sphere like a ball bearing, and a hemispherical mounting hole is formed in the upper surface of the protrusion part 362*a* so that the spherical protrusion 362*b* can be seated rotatably (See the partially enlarged view of FIG. 12).

When the protrusion 362*b* is pressed, the pawl 361 combined with the shifting bar 362 swings inside the seating groove 321 goes down from the outer circumferential surface of the input shaft 320. Therefore, the pawl 361 protruding over the outer circumferential surface of the input shaft 320 by the elastic member 322 swings to escape into the seating groove 321 and does not protrude over the outer circumferential surface of the input shaft 320 anymore. In this instance, because the pawl 361 does not engage with the ratchet (340*a* in FIG. 14), even though the input shaft 320 rotates, the driving gears 340 does not rotate.

Furthermore, when the external force acting to the protrusion part 362*a* is removed, the pawl 361 swings by elastically restoring force of the elastic member 322 compressed elastically at the lower portion of the pawl 361 and protrudes over the outer circumferential surface of the input shaft 320. As described above, when the pawl 361 protrudes over the outer circumferential surface of the input shaft 320, the pawl 361 engages with the ratchet 340*a* to rotate the driving gear 340.

FIG. 15(*c*) illustrates a state where the inner ring 363 is inserted into the outer circumferential surface of the input shaft 320. As shown in the drawing, the inner ring 363 has a guide pin 363*a* formed to protrude.

Figure 16:
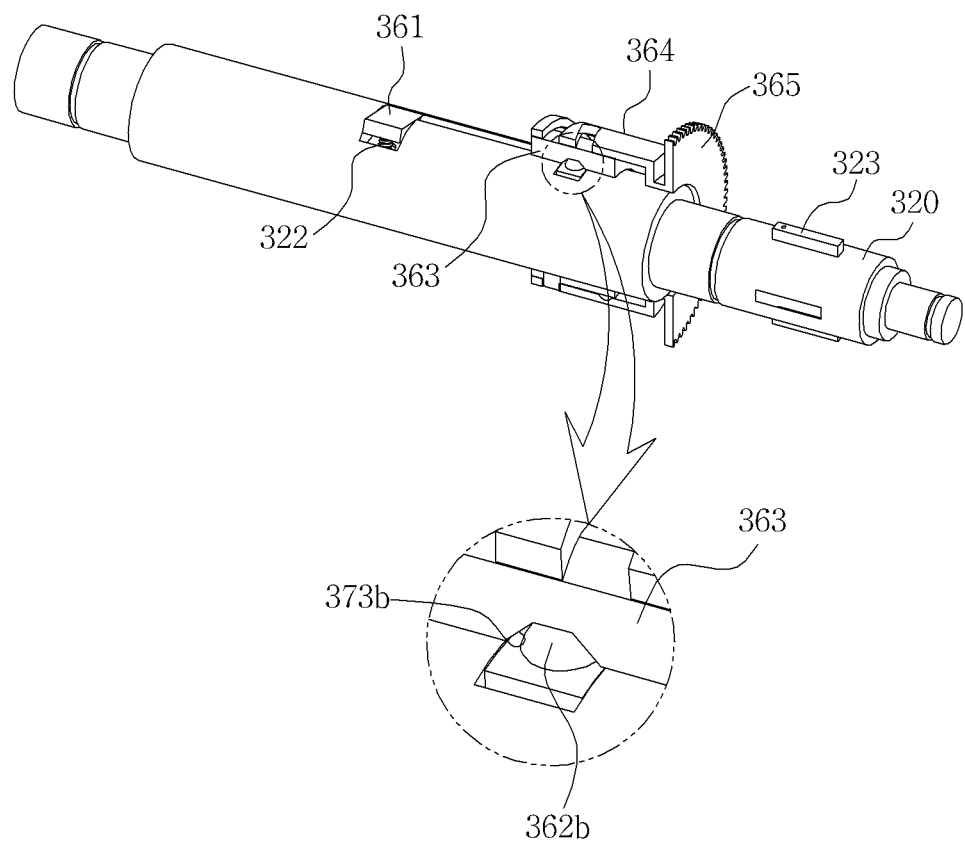

FIG. 16(*d*) illustrates a state where the outer ring 364 is combined with the inner ring 363 while surrounding the inner ring 363. The outer ring 364 is an example of the moving unit which moves the inner ring 363 in the axial direction of the input shaft or the output shaft.

As shown in the drawing, the outer ring 364 has a guide hole 364*a*, and the guide hole 364*a* is formed in a diagonal direction with respect to a circumferential direction. Furthermore, the guide pin 363*a* is assembled to be restricted to the guide hole 364*a*. Therefore, when the outer ring 364 rotates, since the guide pin 363*a* moves along the guide hole 364*a* in the diagonal direction, the inner ring 363 moves from side to side in an axial direction of the input shaft inside the outer ring 364.

As described above, when the inner ring 363 moves from side to side, a ring groove (363*b* in FIG. 16) moves from side to side, and the protrusion 362*b* of the shifting bar, which corresponds to the ring groove, escapes into the ring groove 363*b* and the pawl 361 protrudes over the outer circumferential surface of the input shaft 320. In order to move the inner ring 363 from side to side, the outer ring 364 has to rotate. So, the rotating unit 365 is formed integrally or combined with one side of the outer ring 364. The outer ring 364 can rotate when the rotating unit 365 rotates, then, the inner ring 363 moves forward or backward in the axial direction, and it controls that the pawl 361 protrudes or escapes into the seating groove 321 by the forward and backward movement of the inner ring 363.

FIG. 16 illustrates the state where the pawl 361 protrudes out without being seated in the seating groove 321, namely, the state where the pawl 361 protrudes outwardly from the outer circumferential surface of the input shaft 340.

The inner ring 363 has a band-shaped ring groove 363*b* formed on the inner circumferential surface of the inner ring 363 in the circumferential direction.

When the inner ring 363 moves in the axial direction of the input shaft 320 and the ring groove 363*b* is located on the protrusion 362*b* of the shifting bar, the protrusion 362*b* escapes into the ring groove 363*b* by the elastic member 322 and can swing. When the protrusion 362*b* of the shifting bar 362 escapes into the ring groove 363*b*, the pawl 361 protrudes over the outer circumferential surface of the input shaft 320.

In this embodiment, the ring groove 363*b* is formed to make the protrusion 362*b* escape, but it is also possible that the ring groove 363*b* makes the protrusion part 362*a* escape.

Now, an operational state will be described. First, when the outer ring 364 rotates, the inner ring 363 moves in the axial direction, namely, in a horizontal direction, from the input shaft.

When the ring groove 363*b* formed on the inner circumferential surface by movement of the inner ring 363 is located on the protrusion 362*b*, the protrusion 362*b* escapes into the ring groove 363*b* by elastic force of the elastic member 322.

After that, the pawl 361 swings to protrude over the outer circumferential surface of the input shaft 320. The protruding pawl 361 engages with the ratchet 340a and rotary force of the input shaft 320 is transmitted to the driving gear 340, so that the driving gear 340 is rotated.

In this embodiment, in order to rotate the outer ring 364, the rotating unit 365 is formed integrally with one side of the outer ring 364, and the rotating unit 365 is rotated in the forward or backward direction. However, differently from the above, it is also possible that the outer ring 364 can be rotated forward or backward by a subminiature motor (not shown).

Furthermore, in this embodiment, the controller 360 has the outer ring 364 in order to move the inner ring 363 from side to side on the input shaft 320. It is also possible that a moving unit for moving the inner ring 363 on the input shaft from side to side may be disposed instead of the outer ring 364 and a rotating means for rotating the outer ring.

The moving unit may be a well-known driving source, such as a subminiature motor or a cylinder.

FIGS. 15 and 16 illustrate the controller 360 disposed on the input shaft 320, but the controller 370 disposed on the output shaft 330 has the same structure and action, and its repeated description will be omitted.

Figure 9:
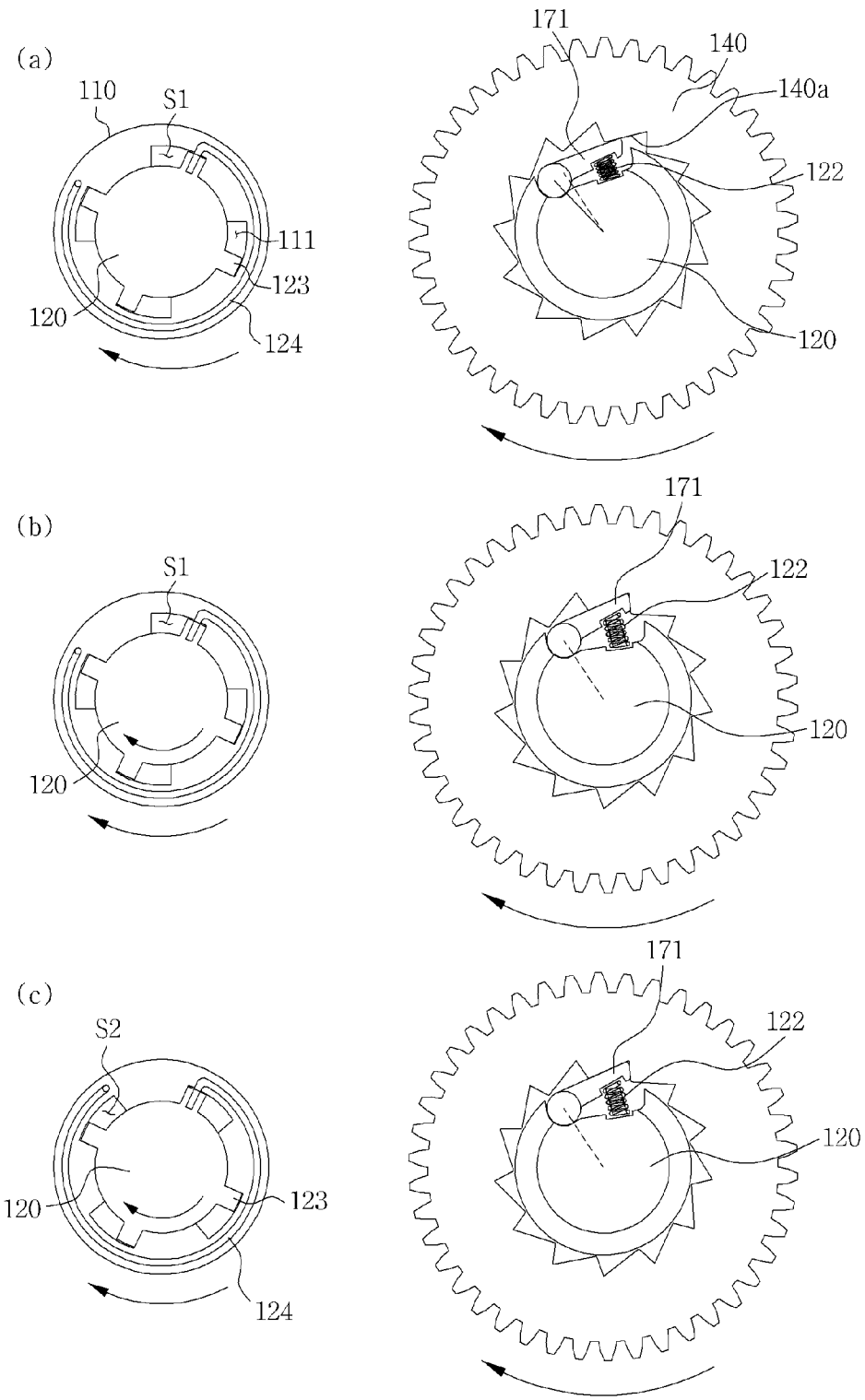
FIG. 9 is a view showing an operational state of the shift clutch and the input shaft when pawls swing.

In this embodiment, the structure and action of the clutch is the same as the clutch described referring to FIGS. 8 and 9.

Hereinafter, an operation state of the multi-gear transmission according to the present invention will be described.

Referring to FIGS. 12 and 13, when the driving force of the motor is transmitted to rotate the input shaft 320 through the shift clutch 310, a passenger manipulates the controller 360 or 370 to make any one of the pawls 361a, 261b, 371a and 371b protrude. Then, the driving gears 342 and 344 or the driven gears 351 or 353 are combined with the input shaft 320 or the output shaft 330, and the shifted rotary speed is outputted to the output shaft 33.

For instance, in case that the passenger wants to do the second stage shifting, the rotating unit 365 rotates the outer ring 364, then, the inner ring 363 moves to the left or the right on the input shaft. Through the above action, the protrusion 362b of the protrusion part corresponding to the second stage shifting escapes into the ring groove 363b of the inner ring, so that the pawl (361b in FIG. 12) engages with the ratchet of the second stage driving gear 342 corresponding to the second stage shifting.

Therefore, the rotary force of the input shaft 340 rotates the second driving gear 342, and rotates the second driven gear 352 meshed with the second driving gear. Because the output shaft 330 is fixed at the center of the second driven gear 352, the output shaft 330 outputs the shifted rotary force.

The output unit 330 is connected with, for instance, a front wheel axle or a rear wheel axle of an electric vehicle to transmit the shifted rotary force, or is connected with a driving sprocket of an electric motorcycle or an electric bicycle to transmit the shifted rotary force to a rear wheel through a chain.

Additionally, in case that the passenger wants to do the third stage shifting, the passenger manipulates the controller 370 to make the pawl (371a in FIG. 12) protrude toward the outer circumferential surface of the output shaft 330, then, the pawl 371a engages with the ratchet of the third driven gear 353 corresponding to the third stage shifting.

Therefore, the rotary force of the input shaft 320 rotates the third driving gear 343 fixed on the input shaft, and rotates the third driven gear 353 meshed with the third driving gear 343. Because the output shaft 330 is combined with the center of the third driven gear 353 by the pawl 371a, the output shaft 330 interlocks with the third driven gear 353 to output the shifted rotary force.

Figure 17:
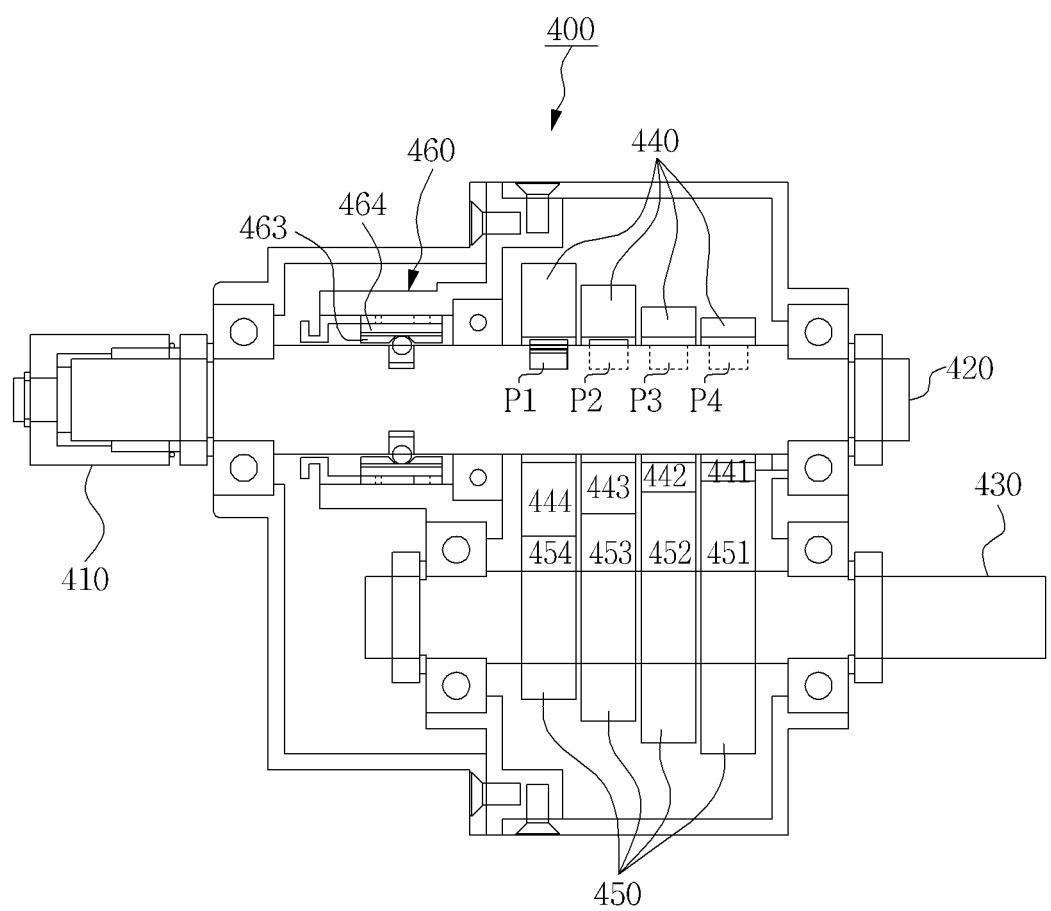
FIG. 17 is a view of a multi-gear transmission for a motor according to a fourth preferred embodiment of the present invention.

FIG. 17 illustrates a multi-gear transmission for a motor according to a fourth preferred embodiment of the present invention.

As shown in the drawing, a shift clutch 410 is disposed at one end of an input shaft 420. The input shaft 420 has a retaining protrusion and the shift clutch 410 has a retaining groove in the same way as the multi-gear transmission for a motor according to the third preferred embodiment. Moreover, a controller 460 has the same structure as the multi-gear transmission for a motor according to the third preferred embodiment.

The input shaft 420 penetrates through four driving gears 440, and has four pawls P1 to P4, which engage with driving gears 440 and are disposed to protrude and retract, so as to be combined with or released from the driving gears by control of the controller 460.

Unlike, driven gears 450 are combined with an output shaft 430, and pawls are not provided.

Therefore, a controller 460 having an outer ring 464 and an inner ring 463 is not disposed on the output shaft 430 but is disposed just on the input shaft 420.

Figure 18:
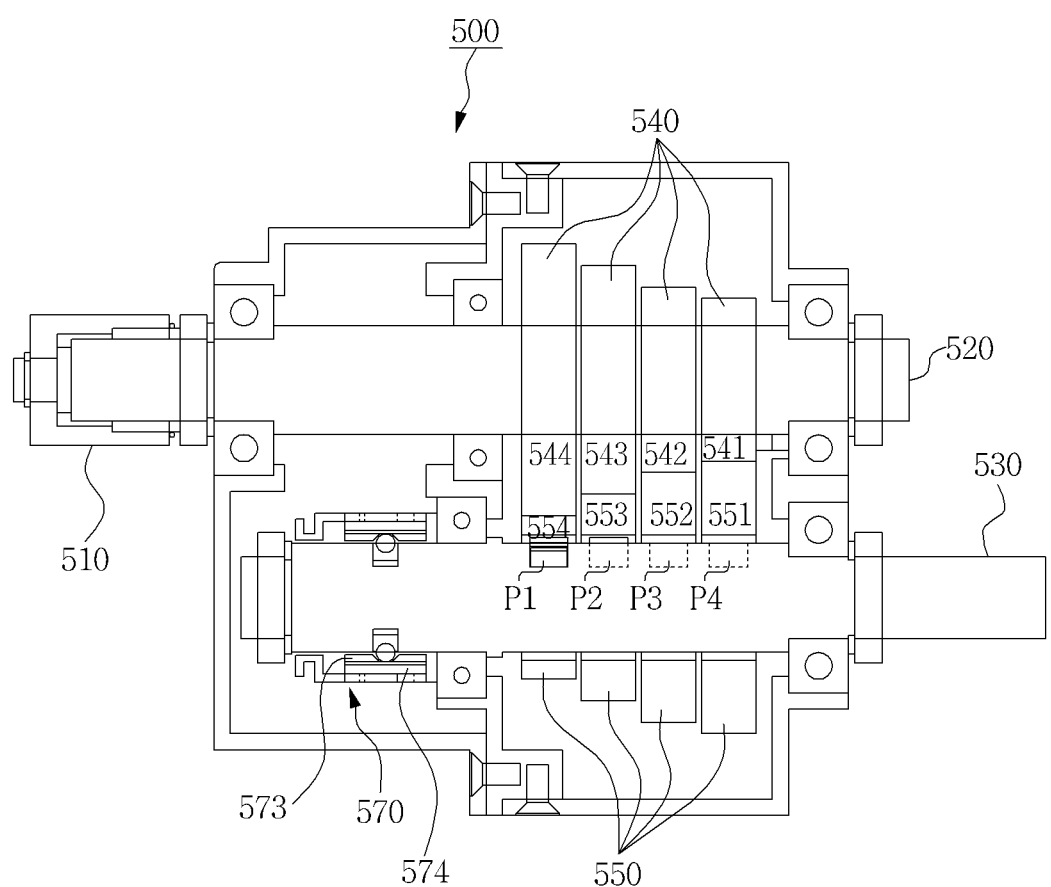
FIG. 18 is a view of a multi-gear transmission for a motor according to a fifth preferred embodiment of the present invention.

FIG. 18 illustrates a multi-gear transmission for a motor according to a fifth preferred embodiment of the present invention.

Compared with the multi-gear transmission according to the fifth preferred embodiment, an output shaft 530 penetrate through four driven gears 550, and four pawls P1 to P4 engaging with the driven gears 550 are disposed to protrude and retract, so that the pawls are combined with or released from the driven gears by control of a controller 570.

Unlike, driving gears 540 are combined with an input shaft 520, and pawls are not provided.

Therefore, the controller 570 having an outer ring 574 and an inner ring 573 is not disposed on the input shaft 520 but is disposed just on the output shaft 530.

However, like the multi-gear transmission according to the fourth preferred embodiment, the shift clutch 510 is disposed at one end of the input shaft 520.

INDUSTRIAL APPLICABILITY

If the transmission for a motor according to the present invention is applied to transportation means, such as automobiles, motorcycles or electric bicycles, it satisfies all of torque (power) and speed, makes it possible to run on a steep hillside, and maximizes fuel efficiency.

Moreover, the transmission for a motor according to the present invention can maximize efficiency of the motor and the battery if it is applied to generators, machine tools or power tools.

The invention claimed is:

1. A transmission for a motor comprising:
    an input shaft rotating by driving force transmitted from the motor and having a plurality of pawls disposed on the outer circumferential surface;
    a controller for controlling protrusion and retraction of the pawls;
    a plurality of driving gears through the centers of which the input shaft passes, which have ratchets formed on the inner circumferential surfaces thereof so as to be engaged with the pawls, and which are different in the number of gear teeth;

a plurality of driven gears which are externally meshed with the driving gears and are different in the number of gear teeth; and an output unit for outputting rotary speed changed in speed by the driving gears and the driven gears, wherein the controller comprises:

a plurality of shifting bars each of which one end is combined with the pawl and the other end has a protrusion part disposed on the outer circumferential surface of the input shaft to protrude and retract; and an elastic member disposed below the pawl or the protrusion part to elastically support the pawl or the protrusion part.

2. The transmission according to claim 1, wherein the controller further comprises:

an inner ring through the centers of which the input shaft passes, and which reciprocates in an axial direction of the input shaft in order to make the protrusion part protrude from and retract to the outer circumferential surface of the input shaft; and a moving unit for moving the inner ring in the axial direction of the input shaft.

3. The transmission according to claim 2, wherein the moving unit is an outer ring which surrounds the outer side of the inner ring and rotates to move the inner ring in the axial direction of the input shaft.

4. The transmission according to claim 3, wherein a guide pin protrudes from any one among the inner ring and the outer ring, and a guide hole for guiding the guide pin is formed on the other one in a diagonal direction with respect to a circumferential direction.

5. The transmission according to claim 2, wherein the inner ring has a ring groove formed on the inner circumferential surface thereof in the circumferential direction so that the protrusion part protrudes out and escapes into the ring groove.

6. The transmission according to claim 5, wherein a rotating spherical protrusion is disposed on the protrusion part to protrude, and the ring groove has a semi-circular cross section so that the spherical protrusion escapes into the ring groove.

7. The transmission according to claim 1, wherein the driven gears rotate at the same speed.

8. The transmission according to claim 7, wherein the output unit is combined with any one among the driving gears to receive and output the shifted rotary speed.

9. The transmission according to claim 7, wherein the output unit receives the shifted rotary speed from any one among the driven gears and outputs the rotary speed.

10. The transmission according to claim 1, wherein the input shaft includes a retaining protrusion formed at one end of the input shaft, and a shift clutch through the center of which the input shaft penetrates, which has a retaining groove formed on the inner circumferential surface so that the retaining protrusion is caught to the retaining groove, and to which driving force of the motor is inputted.

11. The transmission according to claim 10, further comprising:

a spring of which one end is connected to the shift clutch and the other end is connected to the input shaft.

12. The transmission according to claim 10, wherein the retaining groove is wider than the retaining protrusion so that the retaining protrusion can move inside the retaining groove.

13. A transmission for a motor comprising:

an input shaft rotating by driving force transmitted from the motor;

a plurality of driving gears having the input shaft in the middle of the driving gears and being different in the number of gear teeth;

a plurality of driven gears which are externally meshed with the driving gears and are different in the number of gear teeth;

an output shaft being parallel with the input shaft, serving as a central shaft of the driven gears, and outputting rotary speed changed in speed by the driving gears and the driven gears;

a plurality of pawls disposed on the input shaft or the output shaft to protrude or retract from the outer circumferential surface; and a controller for controlling protrusion and retraction of the pawls, wherein the controller comprises:

a plurality of shifting bars each of which one end is combined with the pawl and the other end has a protrusion part, which protrudes or retracts from the outer circumferential surface of the input shaft or the output shaft;

an elastic member for elastically supporting lower portions of the pawl or the protrusion part.

14. The transmission according to claim 13, wherein the controller further comprises:

an inner ring through the center of which the input shaft or the output shaft penetrates, and reciprocating in an axial direction of the input shaft or the output shaft to make the protrusion part protrude or retract from the outer circumferential surface of the input shaft or the output shaft; and a moving unit for moving the inner ring in the axial direction of the input shaft or the output shaft.

15. The transmission according to claim 14, wherein the moving unit is an outer ring which surrounds the outer side of the inner ring and rotates to move the inner ring in the axial direction of the input shaft or the output shaft.

16. The transmission according to claim 15, wherein a guide pin protrudes from any one among the inner ring and the outer ring, and a guide hole for guiding the guide pin is formed on the other one in a diagonal direction with respect to a circumferential direction.

17. The transmission according to claim 14, wherein the inner ring has a ring groove formed on the inner circumferential surface thereof in the circumferential direction so that the protrusion part escapes into the ring groove.

18. The transmission according to claim 16, wherein a rotating spherical protrusion is disposed on the protrusion part to protrude, and the ring groove has a semi-circular cross section so that the spherical protrusion escapes into the ring groove.

19. The transmission according to claim 13, wherein one among the driving gears and the driven gear which are externally meshed with each other has a ratchet formed on the inner circumferential surface to be engaged with the pawl, and wherein the other one among the driving gears and the driven gear which are externally meshed with each other is fixed at the input shaft or the output shaft.

* * * * *